US012777480B2

(12) United States Patent
Chen et al.

(10) Patent No.: US 12,777,480 B2
(45) Date of Patent: Oct. 27, 2026

(54) COMMUNICATION METHOD AND APPARATUS

(71) Applicant: Huawei Technologies Co., Ltd., Shenzhen (CN)

(72) Inventors: Lei Chen, Beijing (CN); Bingzhao Li, Beijing (CN); Bin Xu, Beijing (CN); Yan Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 380 days.

(21) Appl. No.: 18/347,950

(22) Filed: Jul. 6, 2023

(65) Prior Publication Data

US 2023/0354334 A1 Nov. 2, 2023

Related U.S. Application Data

(63) Continuation of application No. PCT/CN2021/070710, filed on Jan. 7, 2021.

(51) Int. Cl.
*H04W 72/1273* (2023.01)
*H04W 72/543* (2023.01)

(52) U.S. Cl.
CPC ..... *H04W 72/1273* (2013.01); *H04W 72/543* (2023.01)

(58) Field of Classification Search
CPC .......... H04W 72/1273; H04W 72/543; H04W 72/542
See application file for complete search history.

(56) References Cited

U.S. PATENT DOCUMENTS

2021/0274529 A1* 9/2021 Chen ................ H04W 72/1273
2023/0090232 A1* 3/2023 Shi ...................... H04L 47/2483
370/235

FOREIGN PATENT DOCUMENTS

CN 102932852 A 2/2013
CN 108811153 A 11/2018
CN 109600664 A 4/2019

* cited by examiner

*Primary Examiner* — Jung H Park
(74) *Attorney, Agent, or Firm* — Slater Matsil, LLP

(57) ABSTRACT

An access network device receives configuration information of a first QoS flow, where the first QoS flow supports a plurality of types of data packets, and the configuration information includes QoS parameters respectively corresponding to the plurality of types; and performs, after receiving a first data packet in the first QoS flow, downlink scheduling on the first data packet based on a QoS parameter corresponding to a type of the first data packet.

8 Claims, 11 Drawing Sheets

COMMUNICATION METHOD AND APPARATUS

CROSS-REFERENCE TO RELATED APPLICATIONS

This application is a continuation of International Application No. PCT/CN2021/070710, filed on Jan. 7, 2021, the disclosure of which is hereby incorporated by reference in its entirety.

TECHNICAL FIELD

This application relates to the field of wireless communication technologies, and in particular, to a communication method and apparatus.

BACKGROUND

In a mobile communication network, an operator can provide a user with a wide variety of services, such as a virtual reality (VR) service, an augmented reality (AR) service, a high-definition video service, and a tactile internet service. Video transmission in these services is used as an example. A video usually has a plurality of encoding schemes, for example, a hierarchical coding scheme and a non-hierarchical coding scheme. The hierarchical coding scheme is used as an example. In this scheme, one basic layer (BL) and several enhancement layers (ELs) form a multi-layer video system. The basic layer provides a bitstream with basic image quality, and the enhancement layer provides a bitstream with higher image quality constructed on the basis of the basic image quality.

However, how to perform differentiated scheduling on different types of data packets obtained through encoding still needs further research.

SUMMARY

This application provides a communication method and apparatus, to perform differentiated scheduling on different types of data packets.

According to a first aspect, an embodiment of this application provides a communication method. The method is used to implement a function on a network device side. For example, the method is applicable to an access network device or a chip in the access network device. A specific execution body of the method is not limited in this embodiment of this application. For example, the method is applicable to the access network device. In the method, the access network device receives configuration information of a first QoS flow from a first core network device, where the configuration information of the first QoS flow includes QoS parameters of the first QoS flow, the first QoS flow supports a plurality of types of data packets, and the QoS parameters of the first QoS flow includes QoS parameters respectively corresponding to the plurality of types; receives a first data packet in the first QoS flow from a second core network device; and performs downlink scheduling on the first data packet based on a QoS parameter corresponding to a type of the first data packet.

According to the method, the QoS parameters of the first QoS flow can include the QoS parameters respectively corresponding to the plurality of types, so that the access network device can perform, after receiving a data packet in the first QoS flow, downlink scheduling on the data packet based on a QoS parameter corresponding to a type of the data packet. This implements differentiated scheduling on different types of data packets in the same QoS flow, and improves user service experience.

In a possible design, the method further includes: receiving first indication information from the second core network device, where the first indication information indicates the type of the first data packet.

In a possible design, the first data packet and the first indication information are carried in a second data packet from the second core network device, and the first indication information is carried in a header of the second data packet.

In a possible design, the method further includes: mapping, based on a correspondence between the type of the first data packet and a logical channel, the first data packet to the logical channel corresponding to the type of the first data packet.

According to the method, the access network device can map different types of data packets to corresponding logical channels for transmission. This can effectively meet transmission requirements of the different types of data packets. For example, if a QoS parameter corresponding to a first type indicates that a transmission reliability requirement of a first-type data packet is high and a QoS parameter corresponding to a second type indicates that a transmission reliability requirement of a second-type data packet is low, the first type may be duplicated/repeatedly transmitted on a plurality of logical channels, and the second type may be transmitted on a single logical channel. In other words, a quantity of logical channels corresponding to the first type may be greater than a quantity of logical channels corresponding to the second type.

In a possible design, the plurality of types include a first type, and a QoS parameter corresponding to the first type includes at least one of the following: first information, where the first information indicates whether a first-type data packet is allowed to be discarded; and second information, where the second information indicates a quantity of first-type data packets that are allowed to be discarded within a specified time.

According to a second aspect, an embodiment of this application provides a communication method. The method is used to implement a function on a network device side. For example, the method is applicable to a CU or a chip in the CU. A specific execution body of the method is not limited in this embodiment of this application. For example, the method is applicable to the CU. In the method, the CU receives configuration information of a first QoS flow from a first core network device, where the configuration information of the first QoS flow includes QoS parameters of the first QoS flow, the first QoS flow supports a plurality of types of data packets, and the QoS parameters of the first QoS flow include QoS parameters respectively corresponding to the plurality of types; and sends, to a DU, configuration information of a DRB corresponding to the first QoS flow, where the configuration information of the DRB includes the QoS parameters respectively corresponding to the plurality of types.

According to the method, the CU can send, to the DU, the QoS parameters respectively corresponding to the plurality of types, so that the DU can perform, after receiving a data packet, downlink scheduling on the data packet based on a QoS parameter corresponding to a type of the data packet. This implements differentiated scheduling on different types of data packets in the same QoS flow.

In a possible design, the method further includes: receiving a first data packet in the first QoS flow from a second core network device; and sending the first data packet and second indication information to the DU, where the second indication information indicates a type of the first data packet.

In a possible design, the sending the first data packet and second indication information to the DU includes: sending a third data packet to the DU, where the third data packet includes the first data packet and the second indication information, and the second indication information is carried in a header of the third data packet.

In a possible design, the method further includes: sending third indication information to the DU, where the third indication information indicates quantities of downlink tunnel addresses respectively corresponding to the plurality of types; and receiving a first message from the DU, where the first message includes downlink tunnel addresses respectively corresponding to the plurality of types. That the third indication information indicates quantities of downlink tunnel addresses respectively corresponding to the plurality of types may be replaced with that the third indication information indicates quantities of logical channels respectively corresponding to the plurality of types.

According to the method, the CU can configure the quantities of logical channels corresponding to the different types of data packets. This can effectively meet transmission requirements of the different types of data packets. For example, if a QoS parameter corresponding to a first type indicates that a transmission reliability requirement of a first-type data packet is high and a QoS parameter corresponding to a second type indicates that a transmission reliability requirement of a second-type data packet is low, the first type may be duplicated/repeatedly transmitted on a plurality of logical channels, and the second type may be transmitted on a single logical channel. In other words, a quantity of logical channels corresponding to the first type may be greater than a quantity of logical channels corresponding to the second type.

In a possible design, the method further includes: receiving a first data packet in the first QoS flow from the second core network device; and sending the first data packet to the DU through a first tunnel, where a downlink tunnel address corresponding to the first tunnel is a downlink tunnel address corresponding to the type of the first data packet.

According to a third aspect, an embodiment of this application provides a communication method. The method is used to implement a function on a network device side. For example, the method is applicable to a DU or a chip in the DU. A specific execution body of the method is not limited in this embodiment of this application. For example, the method is applicable to the DU. In the method, the DU receives configuration information of a DRB from a CU, where the DRB corresponds to a first QoS flow, the first QoS flow supports a plurality of types of data packets, and the configuration information of the DRB includes QoS parameters respectively corresponding to the plurality of types; receives a first data packet from the CU; and performs downlink scheduling on the first data packet based on a QoS parameter corresponding to a type of the first data packet.

In a possible design, the method further includes: receiving second indication information from the CU, where the second indication information indicates the type of the first data packet.

In a possible design, the first data packet and the second indication information are carried in a third data packet from the CU, and the second indication information is carried in a header of the third data packet.

In a possible design, the method further includes: receiving third indication information from the CU, where the third indication information indicates quantities of downlink tunnel addresses respectively corresponding to the plurality of types; and sending a first message to the CU, where the first message includes downlink tunnel addresses respectively corresponding to the plurality of types.

In a possible design, the receiving a first data packet from the CU includes: receiving the first data packet from the CU through a first tunnel, where a downlink tunnel address corresponding to the first tunnel is a downlink tunnel address corresponding to the type of the first data packet.

According to a fourth aspect, an embodiment of this application provides a communication method. The method is used to implement a function on a network device side. For example, the method is applicable to a first core network device or a chip in the first core network device. A specific execution body of the method is not limited in this embodiment of this application. For example, the method is applicable to the first core network device. In the method, the first core network device determines configuration information of a first QoS flow, and sends the configuration information of the first QoS flow to an access network device or a CU, where the configuration information of the first QoS flow includes QoS parameters of the first QoS flow, the first QoS flow supports a plurality of types of data packets, and the QoS parameters of the first QoS flow includes QoS parameters respectively corresponding to the plurality of types.

According to a fifth aspect, an embodiment of this application provides a communication method. The method is used to implement a function on a network device side. For example, the method is applicable to a second core network device or a chip in the second core network device. A specific execution body of the method is not limited in this embodiment of this application. For example, the method is applicable to the second core network device. In the method, the second core network device receives a first data packet from an application server, and sends the first data packet and indication information to an access network device or a CU, where the indication information indicates a type of the first data packet.

In a possible design, the sending the first data packet and first indication information to an access network device or a CU includes: sending a second data packet to the access network device or the CU, where the second data packet includes the first data packet and the first indication information, and the first indication information is carried in a header of the second data packet.

It should be noted that the communication methods provided in the first aspect to the fifth aspect correspond to each other. Therefore, for beneficial effects of related technical features in the first aspect to the fifth aspect, refer to each other. Details are not described again.

According to a sixth aspect, an embodiment of this application provides a communication apparatus. The communication apparatus may be an access network device or a chip that can be disposed in the access network device. The communication apparatus has a function of implementing the first aspect. For example, the communication apparatus includes a corresponding module, unit, or means for performing the steps in the first aspect. The function, unit, or means may be implemented by software or hardware, or may be implemented by hardware executing corresponding software.

In a possible design, the communication apparatus includes a processing unit and a communication unit. The communication unit may include a receiving unit and/or a sending unit. The communication unit may be configured to receive and send a signal, to implement communication between the communication apparatus and another apparatus. The processing unit may be configured to perform some internal operations of the communication apparatus. Functions performed by the processing unit and the communication unit may correspond to the operations in the first aspect.

In a possible design, the communication apparatus includes a processor, and may further include a transceiver. The transceiver is configured to receive and send a signal, and the processor completes the method according to any one of the possible designs or implementations of the first aspect by using the transceiver. The communication apparatus may further include one or more memories. The memory is configured to be coupled to the processor, and the memory may store a computer program or instructions for implementing the function in the first aspect. The processor may execute the computer program or the instructions stored in the memory. When the computer program or the instructions are executed, the communication apparatus is enabled to implement the method according to any one of the possible designs or implementations of the first aspect.

In a possible design, the communication apparatus includes a processor, and the processor may be configured to be coupled to a memory. The memory may store a computer program or instructions for implementing the function in the first aspect. The processor may execute the computer program or the instructions stored in the memory. When the computer program or the instructions are executed, the communication apparatus is enabled to implement the method according to any one of the possible designs or implementations of the first aspect.

In a possible design, the communication apparatus includes a processor and an interface circuit, and the processor is configured to: communicate with another apparatus through the interface circuit, and perform the method according to any one of the possible designs or implementations of the first aspect.

According to a seventh aspect, an embodiment of this application provides a communication apparatus. The communication apparatus may be a CU or a chip that can be disposed in the CU. The communication apparatus has a function for implementing the second aspect. For example, the communication apparatus includes a corresponding module, unit, or means for performing the operations in the second aspect. The module, unit, or means may be implemented by software or hardware, or may be implemented by hardware executing corresponding software.

In a possible design, the communication apparatus includes a processing unit and a communication unit. The communication unit may be configured to receive and send a signal, to implement communication between the communication apparatus and another apparatus. For example, the communication unit is configured to receive uplink information from a terminal device. The processing unit may be configured to perform some internal operations of the communication apparatus. Functions performed by the processing unit and the communication unit may correspond to the operations in the second aspect.

In a possible design, the communication apparatus includes a processor, and may further include a transceiver. The transceiver is configured to receive and send a signal, and the processor completes the method according to any one of the possible designs or implementations of the second aspect by using the transceiver. The communication apparatus may further include one or more memories. The memory is configured to be coupled to the processor, and the memory may store a computer program or instructions for implementing the function in the second aspect. The processor may execute the computer program or the instructions stored in the memory. When the computer program or the instructions are executed, the communication apparatus is enabled to implement the method in any one of the possible designs or implementations of the second aspect.

In a possible design, the communication apparatus includes a processor, and the processor may be configured to be coupled to a memory. The memory may store a computer program or instructions for implementing the function in the second aspect. The processor may execute the computer program or the instructions stored in the memory. When the computer program or the instructions are executed, the communication apparatus is enabled to implement the method in any one of the possible designs or implementations of the second aspect.

In a possible design, the communication apparatus includes a processor and an interface circuit, and the processor is configured to: communicate with another apparatus through the interface circuit, and perform the method according to any one of the possible designs or implementations of the second aspect.

According to an eighth aspect, an embodiment of this application provides a communication apparatus. The communication apparatus may be a DU or a chip that can be disposed in the DU. The communication apparatus has a function of implementing the third aspect. For example, the communication apparatus includes a corresponding module, unit, or means for performing the steps in the third aspect. The function, unit, or means may be implemented by software or hardware, or may be implemented by hardware executing corresponding software.

In a possible design, the communication apparatus includes a processing unit and a communication unit. The communication unit includes a receiving unit and/or a sending unit. The communication unit may be configured to receive and send a signal, to implement communication between the communication apparatus and another apparatus. The processing unit may be configured to perform some internal operations of the communication apparatus. Functions performed by the processing unit and the communication unit may correspond to the operations in the third aspect.

In a possible design, the communication apparatus includes a processor, and may further include a transceiver. The transceiver is configured to receive and send a signal, and the processor completes the method according to any one of the possible designs or implementations of the third aspect by using the transceiver. The communication apparatus may further include one or more memories. The memory is configured to be coupled to the processor, and the memory may store a computer program or instructions for implementing the function in the third aspect. The processor may execute the computer program or instructions stored in the memory. When the computer program or the instructions are executed, the communication apparatus is enabled to implement the method in any one of the possible designs or implementations of the third aspect.

In a possible design, the communication apparatus includes a processor, and the processor may be configured to be coupled to a memory. The memory may store a computer program or instructions for implementing the function in the third aspect. The processor may execute the computer program or instructions stored in the memory. When the computer program or the instructions are executed, the communication apparatus is enabled to implement the method in any one of the possible designs or implementations of the third aspect.

In a possible design, the communication apparatus includes a processor and an interface circuit, and the processor is configured to: communicate with another apparatus through the interface circuit, and perform the method in any one of the possible designs or implementations of the third aspect.

According to a ninth aspect, an embodiment of this application provides a communication apparatus. The communication apparatus may be a first core network device or a chip that can be disposed in the first core network device. The communication apparatus has a function for implementing the fourth aspect. For example, the communication apparatus includes a corresponding module, unit, or means for performing the operations in the fourth aspect. The module, unit, or means may be implemented by software or hardware, or may be implemented by hardware executing corresponding software.

In a possible design, the communication apparatus includes a processing unit and a communication unit. The communication unit may include a receiving unit and/or a sending unit. The communication unit may be configured to receive and send a signal, to implement communication between the communication apparatus and another apparatus. The processing unit may be configured to perform some internal operations of the communication apparatus. Functions performed by the processing unit and the communication unit may correspond to the operations in the fourth aspect.

In a possible design, the communication apparatus includes a processor, and may further include a transceiver. The transceiver is configured to receive and send a signal, and the processor completes the method according to any one of the possible designs or implementations of the fourth aspect by using the transceiver. The communication apparatus may further include one or more memories. The memory is configured to be coupled to the processor, and the memory may store a computer program or instructions for implementing the function in the fourth aspect. The processor may execute the computer program or the instructions stored in the memory. When the computer program or the instructions is/are executed, the communication apparatus is enabled to implement the method according to any one of the possible designs or implementations in the fourth aspect.

In a possible design, the communication apparatus includes a processor, and the processor may be configured to be coupled to a memory. The memory may store a computer program or instructions for implementing the function in the fourth aspect. The processor may execute the computer program or the instructions stored in the memory. When the computer program or the instructions is/are executed, the communication apparatus is enabled to implement the method according to any one of the possible designs or implementations in the fourth aspect.

In a possible design, the communication apparatus includes a processor and an interface circuit, and the processor is configured to: communicate with another apparatus through the interface circuit, and perform the method in any one of the possible designs or implementations of the fourth aspect.

According to a tenth aspect, an embodiment of this application provides a communication apparatus. The communication apparatus may be a second core network device or a chip that can be disposed in the second core network device. The communication apparatus has a function of implementing the fifth aspect. For example, the communication apparatus includes a corresponding module, unit, or means for performing the steps in the fifth aspect. The function, unit, or means may be implemented by software or hardware, or may be implemented by hardware executing corresponding software.

In a possible design, the communication apparatus includes a processing unit and a communication unit. The communication unit may include a receiving unit and/or a sending unit. The communication unit may be configured to receive and send a signal, to implement communication between the communication apparatus and another apparatus. The processing unit may be configured to perform some internal operations of the communication apparatus. Functions performed by the processing unit and the communication unit may correspond to the operations in the fifth aspect.

In a possible design, the communication apparatus includes a processor, and may further include a transceiver. The transceiver is configured to receive and send a signal, and the processor completes the method according to any one of the possible designs or implementations of the fifth aspect by using the transceiver. The communication apparatus may further include one or more memories. The memory is configured to be coupled to the processor, and the memory may store a computer program or instructions for implementing the function in the fifth aspect. The processor may execute the computer program or instructions stored in the memory. When the computer program or instructions are executed, the communication apparatus implements the method in any possible design or implementation of the fifth aspect.

In a possible design, the communication apparatus includes a processor, and the processor may be configured to be coupled to a memory. The memory may store a computer program or instructions for implementing the function in the fifth aspect. The processor may execute the computer program or instructions stored in the memory. When the computer program or instructions are executed, the communication apparatus implements the method in any possible design or implementation of the fifth aspect.

In a possible design, the communication apparatus includes a processor and an interface circuit, and the processor is configured to: communicate with another apparatus through the interface circuit, and perform the method in any possible design or implementation in the fifth aspect.

It may be understood that, in the sixth aspect to the tenth aspect, the processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. In addition, there may be one or more processors, and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to an eleventh aspect, an embodiment of this application provides a communication system. The communication system includes the communication apparatus according to the sixth aspect, the communication apparatus according to the ninth aspect, and the communication apparatus according to the tenth aspect.

According to a twelfth aspect, an embodiment of this application provides a communication system. The communication system includes the communication apparatus according to the seventh aspect and the communication apparatus according to the eighth aspect. Optionally, the communication system may further include the communication apparatus according to the ninth aspect and the communication apparatus according to the tenth aspect.

According to a thirteenth aspect, an embodiment of this application provides a computer-readable storage medium. The computer storage medium stores computer-readable instructions; and when a computer reads and executes the computer-readable instructions, the computer is enabled to perform the method according to any one of the possible designs of the first aspect to the fifth aspect.

According to a fourteenth aspect, an embodiment of this application provides a computer program product. When a computer reads and executes the computer program product, the computer is enabled to perform the method according to any one of the possible designs of the first aspect to the fifth aspect.

According to a fifteenth aspect, an embodiment of this application provides a chip. The chip includes a processor, and the processor is coupled to a memory, and is configured to read and execute a software program stored in the memory, to implement the method according to any one of the possible designs of the first aspect to the fifth aspect.

These aspects or other aspects of this application are more concise and understandable in descriptions of the following embodiments.

DETAILED DESCRIPTION OF ILLUSTRATIVE EMBODIMENTS

The following clearly describes the technical solutions in embodiments of this application with reference to the accompanying drawings in embodiments of this application.

Figure 1:
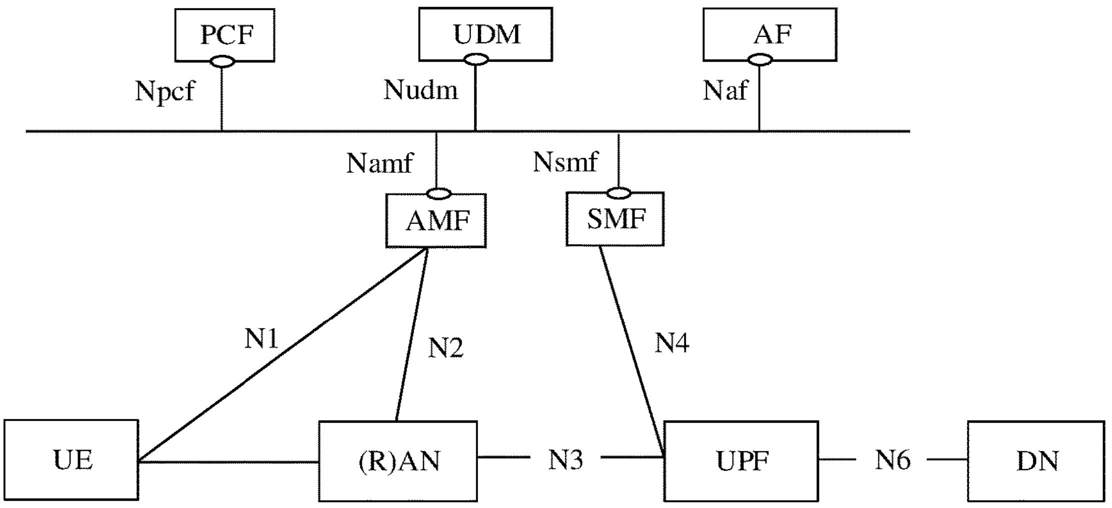
FIG. 1 is a schematic diagram of a network architecture to which an embodiment of this application is applicable.

FIG. 1 is a schematic diagram of a network architecture to which an embodiment of this application is applicable. As shown in FIG. 1, a terminal device may access a wireless network, to obtain a service of an external network (for example, a data network (DN)) through the wireless network, or communicate with another device through the wireless network, for example, communicate with another terminal device. The wireless network includes a (radio) access network ((R)AN) and a core network (CN). The (R)AN (hereinafter described as a RAN) is configured to connect the terminal device to the wireless network, and the CN is configured to manage the terminal device and provide a gateway for communicating with the DN.

The following separately describes in detail the terminal device, the RAN, the CN, and the DN in FIG. 1.

1. Terminal Device

The terminal device includes a device providing a user with voice and/or data connectivity, for example, a handheld device having a wireless connection function, or a processing device connected to a wireless modem. The terminal device may communicate with the core network through the radio access network. The terminal device may be a user device (UE), a wireless terminal device, a mobile terminal device, a device-to-device (D2D) terminal device, a vehicle-to-everything (V2X) terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, user equipment, or the like. For example, the terminal device may include a mobile phone (also referred to as a "cellular" phone), a computer with a mobile terminal device, or a portable, pocket-sized, handheld, or computer built-in mobile apparatus, such as a personal communication service (PCS) phone, a cordless phone, a session initiation protocol (SIP) phone, a wireless local loop (WLL) station, a personal digital assistant (PDA), and another device. The terminal device may further include a limited device, for example, a device with low power consumption, a device with a limited storage capability, or a device with a limited computing capability.

2. RAN

The RAN may include one or more RAN devices (or access network devices), and an interface between the access network device and the terminal device may be a Uu interface (or referred to as an air interface). Certainly, in future communication, names of these interfaces may remain unchanged, or may be replaced with other names. This is not limited in this application.

The access network device is a node or a device that enables the terminal device to access the wireless network. The access network device includes, for example, but is not limited to, a new generation base station (generation NodeB, gNB) in a 5G communication system, an evolved NodeB (eNB), a next-generation evolved NodeB (ng-eNB), a wireless backhaul device, a radio network controller (RNC), a NodeB (NB), a base station controller (BSC), a base transceiver station (BTS), a home NodeB (HeNB) or (HNB), a baseband unit (BBU), a transmitting and receiving point (TRP), a transmitting point (TP), and a mobile switching center.

(i) Protocol Layer Structure

Communication between the access network device and the terminal device is performed in accordance with a specific protocol layer structure. For example, a control plane protocol layer structure may include a radio resource control (RRC) layer, a packet data convergence protocol (PDCP) layer, a radio link control (RLC) layer, a media access control (MAC) layer, and a physical layer. A user plane protocol layer structure may include a PDCP layer, an RLC layer, a MAC layer, and a physical layer; and in a possible implementation, a service data adaptation protocol (SDAP) layer may be included above the PDCP layer.

Data transmission between the access network device and the terminal device is used as an example. The data transmission needs to go through the user plane protocol layer such as the SDAP layer, the PDCP layer, the RLC layer, the MAC layer, and the physical layer. The SDAP layer, the PDCP layer, the RLC layer, the MAC layer, and the physical layer are also collectively referred to as an access stratum. For example, at least one data radio bearer (DRB) is established between the access network device and the terminal device for data transmission. Each DRB may correspond to a group of functional entity sets, for example, include one PDCP layer entity, at least one RLC layer entity corresponding to the PDCP layer entity, at least one MAC layer entity corresponding to the at least one RLC layer entity, and at least one physical layer entity corresponding to the at least one MAC layer entity. It should be noted that at least one signaling radio bearer (SRB) may be established between the access network device and the terminal device for signaling transmission. The DRB and the SRB are collectively referred to as a radio bearer (RB).

Figure 2A:
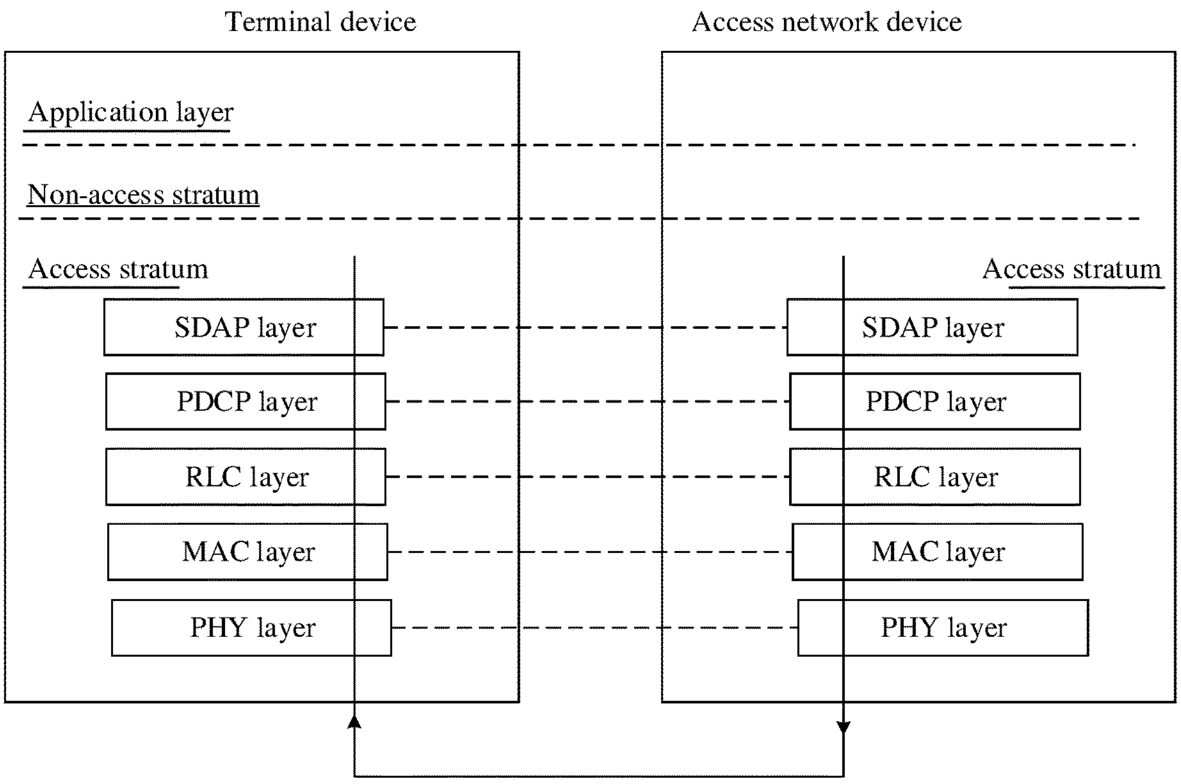
FIG. 2*a* is a diagram of an example of a protocol layer structure between a terminal device and an access network device according to an embodiment of this application.

Downlink data transmission is used as an example. FIG. 2*a* is a schematic diagram of downlink data transmission between layers. In FIG. 2*a*, a downward arrow represents data sending, and an upward arrow represents data receiving. After obtaining data from an upper layer, the SDAP layer entity may map the data to a PDCP layer entity of a corresponding DRB based on a quality of service flow indicator (QFI) of the data. The PDCP layer entity may transmit the data to at least one RLC layer entity corresponding to the PDCP layer entity, and then the at least one RLC layer entity transmits the data to a corresponding MAC layer entity. Then, the MAC layer entity generates a transport block, and a corresponding physical layer entity wirelessly transmits the transport block. The data is correspondingly encapsulated at each layer. Data received by a layer from an upper layer of the layer is considered as a service data unit (SDU) of the layer. After being encapsulated at the layer, the data becomes a protocol data unit (PDU), and is then transferred to a next layer. For example, data received by the PDCP layer entity from an upper layer is referred to as a PDCP SDU, and data sent by the PDCP layer entity to a lower layer is referred to as a PDCP PDU. Data received by the RLC layer entity from an upper layer is referred to as an RLC SDU, and data sent by the RLC layer entity to a lower layer is referred to as an RLC PDU. Data may be transmitted between different layers through corresponding channels. For example, data may be transmitted between the RLC layer entity and the MAC layer entity through a logical channel (LCH), and data may be transmitted between the MAC layer entity and the physical layer entity through a transport channel.

For example, it can be further learned from FIG. 2*a* that, the terminal device further has an application layer and a non-access stratum. The application layer may be used to provide a service for an application installed on the terminal device. For example, downlink data received by the terminal device may be sequentially transmitted from a physical layer to the application layer, and then is provided by the application layer for the application. For another example, the application layer may obtain data generated by the application, sequentially transmit the data to a physical layer, and send the data to another communication apparatus. The non-access stratum may be used to forward user data. For example, the non-access stratum forwards uplink data received from the application layer to a SDAP layer, or forwards downlink data received from a SDAP layer to the application layer.

(2) CU and DU

Figure 2B:
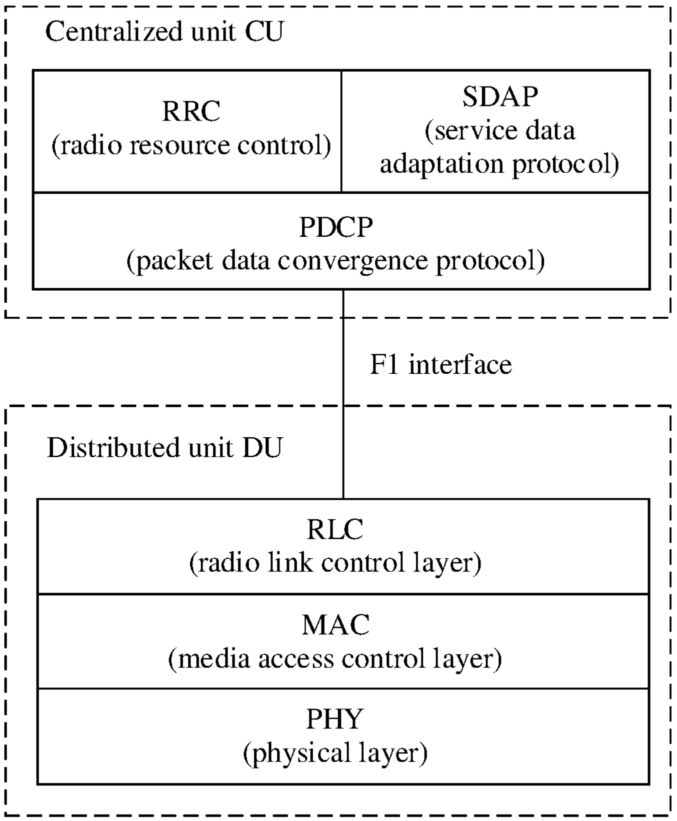
FIG. 2*b* is a schematic diagram of a CU-DU split architecture according to an embodiment of this application.

In embodiments of this application, the access network device may include one or more centralized units (CUs) and one or more distributed units (DUs), and a plurality of DUs may be centrally controlled by one centralized unit. For example, an interface between the CU and the DU may be referred to as an F1 interface. A control plane (CP) interface may be an F1-C interface, and a user plane (UP) interface may be an F1-U interface. Division may be performed on the CU and the DU based on protocol layers of a wireless network. For example, as shown in FIG. 2*b*, functions of a PDCP layer and protocol layers above the PDCP layer are set on the CU, and functions of protocol layers (for example, an RLC layer and a MAC layer) below the PDCP layer are set on the DU.

It may be understood that, division of processing functions of the CU and the DU based on the protocol layers is merely an example, and the processing functions may alternatively be divided in another manner. For example, functions of the protocol layers above the RLC layer are set on the CU, and functions of the RLC layer and the protocol layers below the RLC layer are set on the DU. For another example, functions of more protocol layers may be divided for the CU or the DU. For another example, some processing functions of the protocol layers may be divided for the CU or the DU. In a design, some functions of the RLC layer and functions of the protocol layers above the RLC layer are set on the CU, and remaining functions of the RLC layer and functions of the protocol layers below the RLC layer are set on the DU. In another design, division of functions of the CU or the DU may alternatively be performed based on service types or other system requirements. For example, division may be performed based on latencies. Functions whose processing time needs to satisfy a delay requirement are set on the DU, and functions whose processing time does not need to satisfy the delay requirement are set on the CU. In another design, the CU may alternatively have one or more functions of a core network. For example, the CU may be set on a network side for ease of centralized management; and the DU may have a plurality of radio frequency functions, or radio frequency functions may be set remotely. This is not limited in embodiments of this application.

Figure 2C:
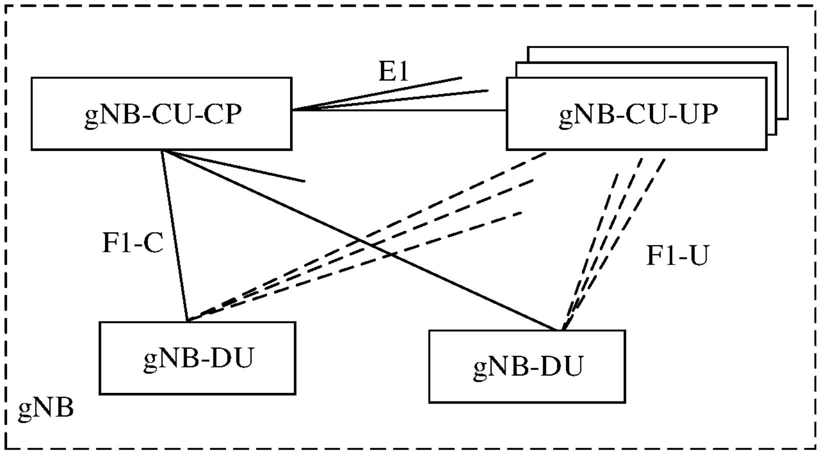
FIG. 2C is a schematic diagram of another CU-DU split architecture according to an embodiment of this application.

For example, the functions of the CU may be implemented by one entity or different entities. For example, as shown in FIG. 2*c*, the functions of the CU may be divided, that is, a control plane and a user plane are separated, and are implemented by using different entities: a control plane CU entity (namely, a CU-CP entity) and a user plane CU entity (namely, a CU-UP entity). The CU-CP entity and the CU-UP entity may be coupled to the DU, to jointly complete a function of the RAN device. An interface between the CU-CP entity and the CU-UP entity may be an E1 interface, an interface between the CU-CP entity and the DU may be an F1-C interface, and an interface between the CU-UP entity and the DU may be an F1-U interface. One DU and one CU-UP may be connected to one CU-CP. Under control of a same CU-CP, one DU may be connected to a plurality of CU-UPs, and one CU-UP may be connected to a plurality of DUs.

Figure 2D:
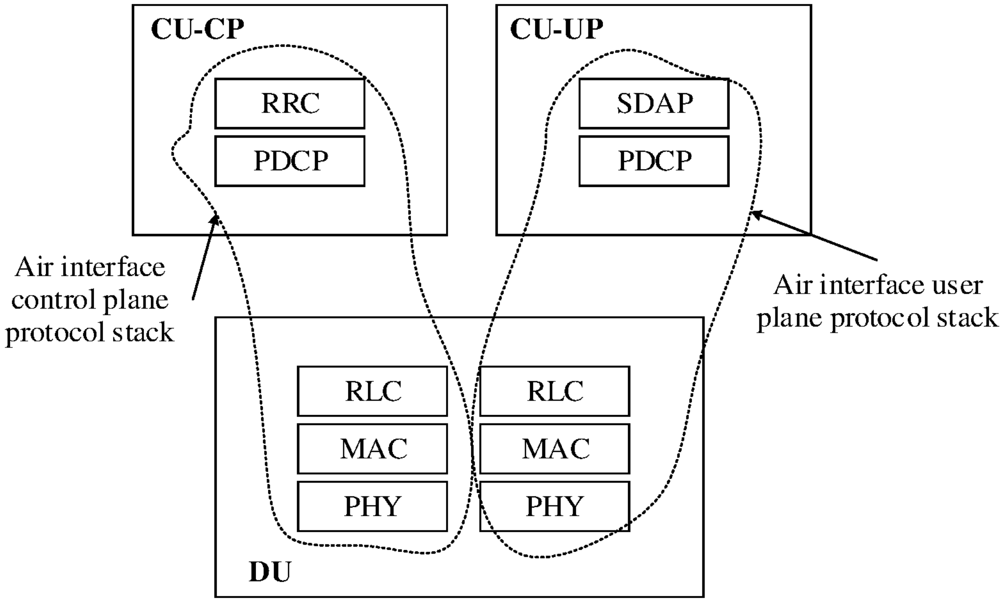
FIG. 2*d* is a schematic diagram of distribution of air interface protocol stacks according to an embodiment of this application.

Based on FIG. 2C, FIG. 2*d* is a schematic diagram of distribution of air interface protocol stacks. As shown in FIG. 2*d*, for both a user plane and a control plane, the air interface protocol stack may be that the RLC layer, the MAC layer, and the PHY layer are on the DU, and the PDCP layer and protocol layers above the PDCP layer are on the CU.

It should be noted that in the architectures shown in FIG. 2*b* to FIG. 2*d*, signaling generated by the CU may be sent to the terminal device via the DU, or signaling generated by the terminal device may be sent to the CU via the DU. The DU may transparently transmit the signaling to the terminal device or the CU by directly encapsulating the signaling at a protocol layer without parsing the signaling. In the following embodiments, if transmission of such signaling between the DU and the terminal device is included, sending or receiving of the signaling by the DU includes this scenario. For example, signaling at the RRC layer or the PDCP layer is finally processed as data at the physical layer and sent to the terminal device, or is converted from received data at the physical layer. In this architecture, it may also be considered that the signaling at the RRC layer or the PDCP layer is sent by the DU, or sent by the DU and the radio frequency apparatus.

3. CN

The CN may include one or more CN devices. A 5G communication system is used as an example. The CN may include an access and mobility management function (AMF) network element, a session management function (SMF) network element, a user plane function (UPF) network element, a policy control function (PCF) network element, a unified data management (UDM) network element, an application function (AF) network element, and the like.

The AMF network element is a control plane network element provided by an operator network, and is responsible for access control and mobility management for accessing the operator network by the terminal device, for example, including functions such as mobility status management, allocation of a temporary user identity, and user authentication and authorization.

The SMF network element is a control plane network element provided by an operator network and is responsible for managing a PDU session of the terminal device. The PDU session is a channel for transmitting a PDU, and the terminal device needs to transmit a PDU to the DN through the PDU session. The SMF network element is responsible for setup, maintenance, deletion, and the like of the PDU session. The SMF network element includes functions related to a session, for example, session management (for example, session setup, modification, and release, including tunnel maintenance between a UPF and a RAN), selection and control of the UPF network element, service and session continuity (SSC) mode selection, and roaming.

The UPF network element is a gateway provided by an operator, and is a gateway for communication between an operator network and the DN. The UPF network element includes functions related to a user plane, for example, data packet routing and transmission, packet detection, quality of service (QoS) processing, uplink packet detection, and downlink data packet storage.

The PCF network element is a control plane function provided by the operator, and is configured to provide a policy of the PDU session for the SMF network element. The policy may include a charging-related policy, a QoS-related policy, an authorization-related policy, and the like.

The AF network element is a function network element configured to provide various business services and can interact with a core network through another network element and interact with a policy management framework to perform policy management.

In addition, although not shown, the CN may further include other possible network elements, for example, a network exposure function (NEF) network element or a unified data repository (UDR) network element.

It should be noted that in this embodiment of this application, the access network device and the core network device may be collectively referred to as a network device.

4. DN

The DN, also be referred to as a packet data network (PDN), is a network outside an operator network. The operator network may access a plurality of DNs. Application servers corresponding to a plurality of services may be deployed in the DN, to provide a plurality of possible services for the terminal device.

In FIG. 1, Npcf, Nudm, Naf, Namf, Nsmf, N1, N2, N3, N4, and N6 are interface sequence numbers. For meanings of these interface sequence numbers, refer to related standard protocols. This is not limited herein.

It may be understood that the 5G communication system is used as an example for illustration in FIG. 1. The solutions in embodiments of this application are applicable to another possible communication system, for example, an LTE communication system or a future 6th generation (6G) communication system. The foregoing network elements or functions may be network elements in a hardware device, may be software functions run on dedicated hardware, or may be instantiated virtualization functions on a platform (for example, a cloud platform). Optionally, the foregoing network elements or the functions may be implemented by one device, may be implemented by a plurality of devices, or may be one functional module in one device. This is not specifically limited in embodiments of this application.

The following first describes related technical features in embodiments of this application. It should be noted that these explanations are intended to make embodiments of this application easier to understand, but should not be considered as a limitation on the protection scope claimed in this application.

1. PDU Session and QoS Flow

In the network architecture shown in FIG. 1, data transmission may be performed between the terminal device and the UPF network element in a PDU session. A plurality of data flows with different QoS requirements may be transmitted in each PDU session, and are referred to as QoS flows.

Figure 3:
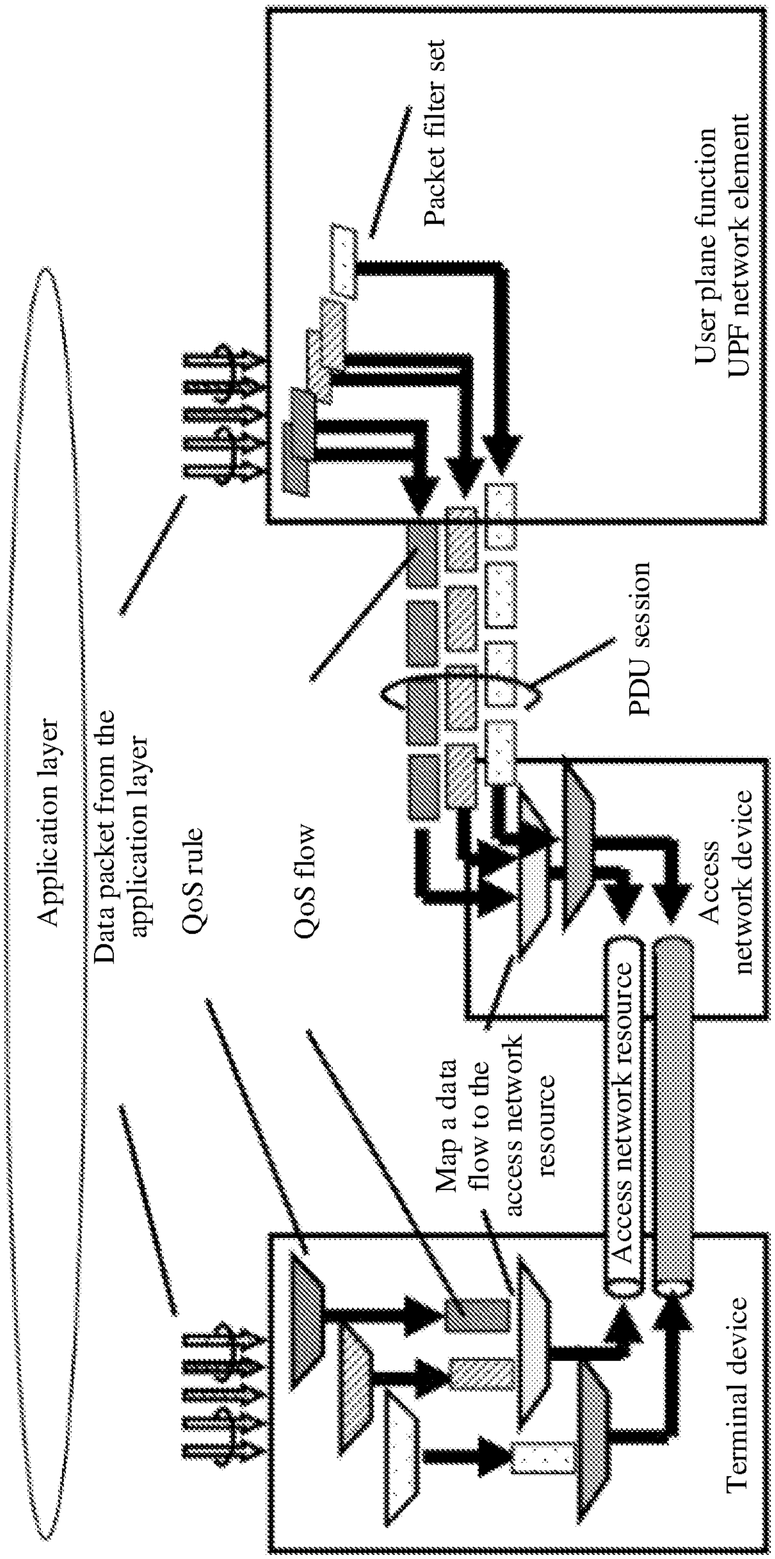
FIG. 3 is a schematic diagram of a QoS model in a 5G communication system.

FIG. 3 is a schematic diagram of a QoS model in the 5G communication system. As shown in FIG. 3, in a downlink direction, after data packets arrive at the UPF network element, the UPF network element distinguishes the downlink data packets into different QoS flows based on packet filter sets in a packet detection rule (PDR) configured by the SMF network element. A data packet in a QoS flow is marked with a QoS flow identifier (QFI). Then, the UPF network element transfers the data packet to the access network device through an N3 interface. After receiving the data packet, the access network device determines, based on the QFI corresponding to the data packet, the QoS flow to which the data belongs, and then transmits the downlink data packet over an air interface based on a QoS parameter of the QoS flow. In an uplink direction, after obtaining data packets, the application layer of the terminal device may distinguish the uplink data packets into different QoS flows based on packet filter sets in a QoS rule configured by the SMF network element, and then transmit the uplink data packets over an air interface. It should be noted that, in embodiments of this application, related implementation in the downlink direction is mainly studied.

It may be understood that before data transmission is performed by using the QoS model, the PDU session between the terminal device and the UPF network element needs to be established by using a PDU session setup process.

Figure 4:
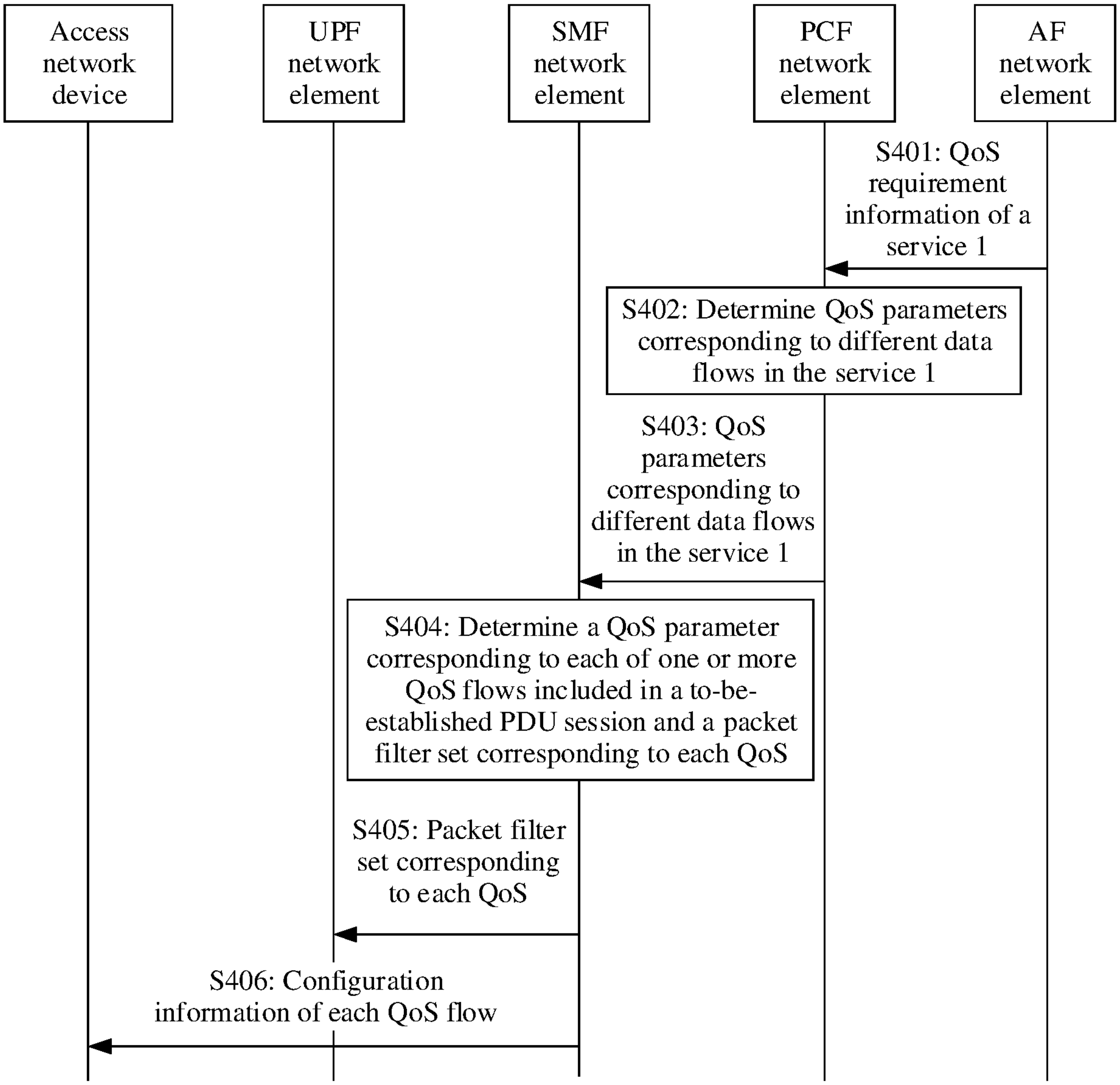
FIG. 4 is a schematic diagram of a partial procedure in a PDU session setup process.

FIG. 4 is a schematic diagram of a partial procedure in the PDU session setup process. Refer to FIG. 4, the procedure may include the following steps.

Step 401: The AF network element sends QoS requirement information of a service (for example, a service 1) to the PCF network element.

Herein, the service 1 may be a VR service, an AR service, a high-definition video service, a tactile internet service, or the like. This is not specifically limited. The service 1 may include a plurality of data flows, for example, a video data flow or an audio data flow. Different data flows may have different QoS requirement information.

Step 402: The PCF network element receives the QoS requirement information of the service 1, and determines, based on the QoS requirement information of the service 1, QoS parameters respectively corresponding to different data flows in the service 1.

Step 403: The PCF network element sends, to the SMF network element, the QoS parameters corresponding to the different data flows in the service 1.

Herein, for example, when the terminal device has a receiving requirement of the service 1, the terminal device may initiate the PDU session setup process. Then, after receiving the PDU session setup request from the terminal device, the SMF network element may send a request message to the PCF network element, where the request message is used to obtain the QoS parameters corresponding to the different data flows in the service 1. Finally, the PCF network element may send the QoS parameters corresponding to the different data flows in the service 1 to the SMF network element.

Step 404: The SMF network element determines configuration information of and a packet filter set corresponding to each of one or more QoS flows included in the to-be-established PDU session.

The configuration information of each QoS flow may include a QoS parameter of the QoS flow. For example, the one or more QoS flows include a first QoS flow, and the first QoS flow is for bearing a video data flow in the service 1. In this case, a QoS parameter corresponding to the first QoS flow is a QoS parameter corresponding to the video data flow.

Step 405: The SMF network element sends, to the UPF network element, the packet filter set corresponding to each of the one or more QoS flows that need to be established in the PDU session. In this way, after receiving data packets from the application server, the UPF network element can distinguish the data packets into different QoS flows based on the packet filter set corresponding to each QoS flow.

Step 406: The SMF network element sends a PDU session resource setup request message to the access network device by using the AMF network element, where the PDU session resource setup request message includes configuration information of each of the one or more QoS flows that need to be established in the PDU session. In this way, the access network device can transmit the downlink data packet over the air interface based on the QoS parameter of each QoS flow included in the configuration information of the QoS flow.

2. QoS Parameter

The QoS flows may include a guaranteed bit rate (GBR) QoS flow and a non-guaranteed bit rate (Non-GBR) QoS flow. A service carried by the GBR QoS flow, such as a conversational video service, has a strict requirement on a delay or a rate, and requires transmission rate assurance of the flow. A service carried by the non-GBR QoS flow, such as a web browsing and file downloading service, requires no real-time rate assurance.

The GBR QoS flow is used as an example. Each GBR QoS flow may correspond to a group of QoS parameters. The group of QoS parameters may include a 5G quality of service identifier (5G QoS identifier, 5QI), a guaranteed flow bit rate (GFBR), and a maximum flow bit rate (MFBR).

The GFBR represents a bit rate guaranteed by a network to be provided to the QoS flow in an average window, and the MFBR is used to limit a bit rate to the highest bit rate expected by the QoS flow (for example, a packet may be dropped by the UE/RAN/UPF when the MFBR is exceeded). GFBRs may be the same in uplink (UL) and downlink (DL), and MFBRs may also be the same in UL and DL.

The 5QI is a scalar to be indexed to a corresponding 5G QoS characteristic. The 5QI is classified into a standardized 5QI, a pre-configured 5QI, and a dynamically allocated 5QI. The standardized 5QI is in a one-to-one correspondence with a group of standardized 5G QoS characteristics. A 5G QoS characteristic corresponding to the pre-configured 5QI may be pre-configured on the access network device. A 5G QoS characteristic corresponding to the dynamically allocated 5QI is sent by the core network device to the access network device.

The standardized 5QI is used as an example. The 5G QoS characteristics corresponding to the standardized 5QI may include the following characteristics.

(1) A resource type includes a GBR, a delay critical GBR, and a non-GBR. A non-GBR QoS flow may use a non-GBR resource type. A GBR QoS flow may use a GBR resource type or a delay critical GBR resource type.

(2) A priority level indicates a resource scheduling priority between 5G QoS flows. This parameter is for distinguishing QoS flows of one terminal device, or may be for distinguishing QoS flows of different terminal devices, and a smaller parameter value indicates a higher priority.

(3) A packet delay budget (PDB) defines a delay upper limit for data packet transmission between the terminal device and the anchor UPF network element.

(4) A packet error rate (PER) defines an upper limit, namely, an upper limit of a rate at which a data packet is processed by a link layer (such as the RLC layer) of a transmitting end but is not submitted to an upper layer (such as the PDCP layer) by a corresponding receiving end. The packet error rate may also be referred to as a packet error ratio, and both may replace each other. It should be noted that, for the GBR QoS flow that uses the delay critical GBR resource type, if a data burst volume sent in a PDB period is less than a default maximum data burst volume and the QoS flow does not exceed the guaranteed flow bit rate, a data packet whose delay is greater than the PDB is denoted as a loss.

(5) An average window is defined for the GBR QoS flow and is for a related network element to collect statistics on the GFBR and MFBR.

(6) A maximum data burst volume (MDBV) indicates a maximum data volume that needs to be served by the 5G access network in a PDB period of the 5G access network, and each QoS flow whose resource type is the delay critical GBR should be associated with one MDBV.

For example, when a standardized 5QI is 82, a resource type corresponding to the standardized 5QI is the delay critical GBR, a priority level is 19, a PDB is 10 ms, a PER is $10^{-4}$, an MDBV is 255 bytes, and an average window is 2000 ms.

3. Video Encoding

A video may be composed of continuous images (pictures, photos, or the like) played continuously. When 24 images are played quickly per second, the human eye considers that the images are continuous images (namely, a video). A frame rate indicates a quantity of images played per second. For example, 24 frames mean that 24 images are played per second, 60 frames means that 60 images are played per second, and so on. A video frame can be understood as an image (That is, one video frame may include a plurality of data packets corresponding to one image). When a frame rate is 60 frames, duration of one video frame is 1000 ms/60 Hz, which is about 16 ms.

Video encoding is to convert a video file from one format to another format, so as to compress the video file and facilitate storage and transmission of the video file. There may be a plurality of video encoding schemes, for example, a hierarchical coding scheme and a non-hierarchical coding scheme.

The hierarchical coding scheme may be hierarchical coding based on time domain, or may be hierarchical coding based on space, or may be hierarchical coding based on quality, or may be hierarchical coding based on any combination of time domain, space, and quality. This is not specifically limited. In an example, a video flow encoded in the hierarchical coding scheme may include a base layer bitstream and an enhancement layer bitstream, the base layer bitstream and the enhancement layer bitstream each are a decoded sub-stream, and the enhancement layer bitstream may include one or more layers. The base layer bitstream may include a base layer data packet, and the base layer data packet is a necessary condition for video playing. Video image quality is poor in this case. The enhancement layer bitstream may include an enhancement layer data packet, and the enhancement layer data packet is a supplementary condition for video playing. For example, if the video image quality corresponding to the basic layer bitstream is smooth image quality, standard definition image quality can be achieved by superimposing a first enhancement layer bitstream on the basis of the base layer bitstream, high definition image quality can be achieved by superimposing a second enhancement layer bitstream on the standard definition image quality, and Blu-ray image quality can be achieved by superimposing a third enhancement layer bitstream on the basis of high definition image quality. In other words, a larger quantity of enhancement layer bitstream superimposed on the basis of the base layer bitstream indicates better image quality of a video obtained through decoding. It should be noted that in embodiments of this application, the two layers (the base layer and the enhancement layer) are used as an example for description, that is, the enhancement layer in embodiments of this application may include one layer or may include a plurality of layers.

There may be a plurality of specific implementations of the non-hierarchical coding scheme. In an example, a video flow encoded in the non-hierarchical coding scheme may include an I frame, a P frame, and a B frame. The I frame, also referred to as an intra frame, is an independent frame carrying all information. The I frame may be decoded independently without referring to other pictures, and may be simply understood as a static picture. A first frame in a video sequence is always the I frame (the I frame is a key frame). The P-frame, also referred to as an inter frame, can be encoded only by referring to a previous I-frame. The P-frame indicates a difference between a current frame and a previous frame (The previous frame can be the I frame or a P frame). During decoding, a buffered picture needs to be superimposed with the difference defined in the current frame to generate a final picture. The B-frame, also referred to as a bidirectionally predicted frame, records differences between a current frame and a previous frame and a backward frame. That is, to decode the B frame, not only a previous buffered picture needs to be obtained, but also a decoded picture needs to be obtained. The previous picture and the backward picture are superimposed with data of the current frame, to obtain a final picture.

According to the description of the foregoing related technical features, in the QoS model shown in FIG. 3, each QoS flow corresponds to one group of QoS parameters, and for all data packets in the QoS flow, the access network device performs unified scheduling based on the QoS parameters of the QoS flow. However, when video encoding is introduced, video data packets mapped to a same QoS flow may include different types of data packets (for example, include a base layer data packet and an enhancement layer data packet, or include a data packet corresponding to an I frame, a data packet corresponding to a P frame, and a data packet corresponding to a B frame). Because QoS requirements of different types of data packets are different, if the access network device performs unified scheduling based on the QoS parameter of the QoS flow, the access network device cannot accurately schedule each data packet. This cannot meet the QoS requirements of different types of data packets, and affects user service experience.

Based on this, embodiments of this application provide a communication method, to implement differentiated scheduling on different types of data packets. This meets QoS requirements of the different types of data packets, and improves user service experience.

The following describes in detail the communication method provided in embodiments of this application with reference to Embodiment 1 to Embodiment 3.

Embodiment 1

Figure 5:
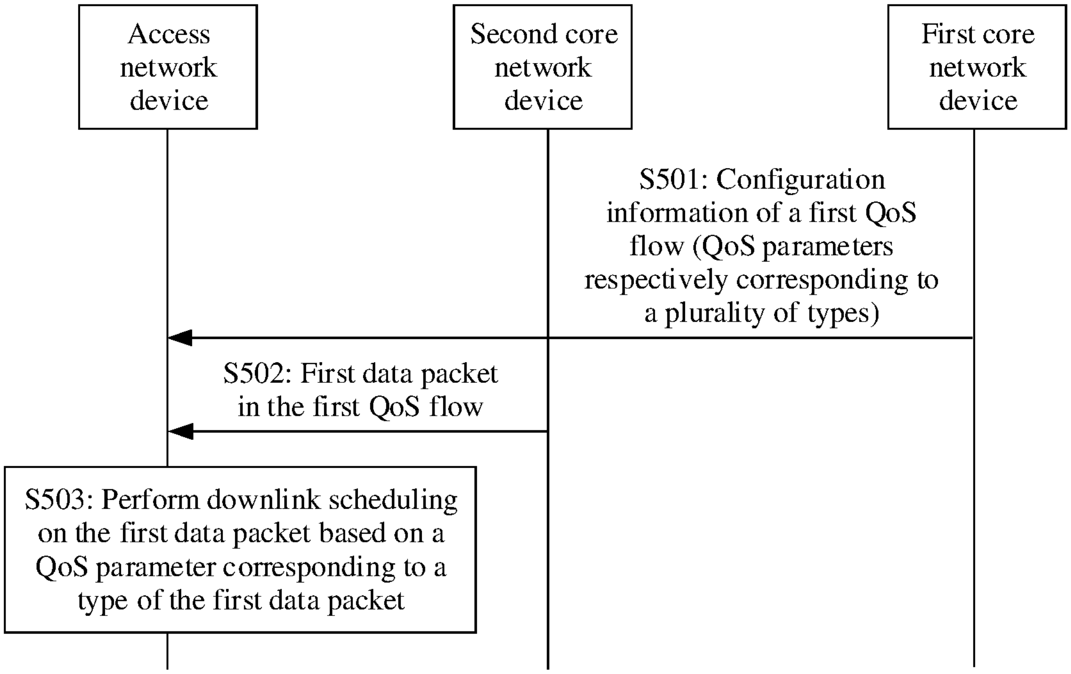
FIG. 5 is a schematic flowchart corresponding to a communication method according to Embodiment 1 of this application.

FIG. 5 is a schematic flowchart corresponding to a communication method according to Embodiment 1 of this application. As shown in FIG. 5, the method includes the following steps.

S501: A first core network device sends configuration information of a first QoS flow to an access network device, and correspondingly, the access network device may receive the configuration information of the first QoS flow. The configuration information of the first QoS flow includes QoS parameters of the first QoS flow, the first QoS flow supports a plurality of types of data packets, and the QoS parameters of the first QoS flow include QoS parameters respectively corresponding to the plurality of types.

Herein, the first core network device may be an SMF network element and/or an AMF network element. An example in which the first core network device is the AMF network element is used in this embodiment of this application.

(1) An implementation in which the AMF network element sends the configuration information of the first QoS flow to the access network device is described.

There may be a plurality of implementations in which the AMF network element sends the configuration information of the first QoS flow to the access network device. In a possible implementation, the AMF network element may send the configuration information of the first QoS flow to the access network device by using a PDU session resource setup request message or a PDU session resource modification request message.

For example, when a terminal device has a downlink service receiving requirement, the terminal device may initiate a PDU session setup process, to trigger the AMF network element to send the PDU session resource setup request message to the access network device, where the PDU session resource setup request message may include an identifier of a to-be-established PDU session and configuration information of a plurality of QoS flows in the PDU session, and the plurality of QoS flows may include the first QoS flow.

For another example, a terminal device needs to modify the first QoS flow in an established PDU session. In this case, the terminal device may initiate a PDU session resource modification process, to trigger the AMF network element to send the PDU session resource modification request message to the access network device, where the PDU session resource modification request message may include the configuration information of the first QoS flow.

It may be understood that the AMF network element may alternatively send the configuration information of the first QoS flow to the access network device by using another possible message. This is not specifically limited.

(2) That the first QoS flow supports the plurality of types of data packets is described.

The first QoS flow supports the plurality of types of data packets. In other words, during data transmission, the first QoS flow transmitted by a UPF network element to the access network device may include at least one of the plurality of types of data packets.

For example, the plurality of types of data packets may be obtained through division based on a plurality of possible bases. For example, the plurality of types of data packets may include a base layer data packet and an enhancement layer data packet (namely, two types of data packets). For another example, the plurality of types of data packets may include at least two of three types of data packets: a data packet corresponding to an I frame, a data packet corresponding to a P frame, and a data packet corresponding to a B frame. For another example, the plurality of types of data packets may include data packets corresponding to different levels obtained by performing hierarchical coding based on time domain (one level may be understood as one type). For another example, the plurality of types of data packets may include data packets corresponding to different levels obtained by performing hierarchical coding based on quality. For another example, the plurality of types of data packets may include data packets corresponding to different levels obtained by performing hierarchical coding based on space. For another example, the plurality of types of data packets may include an important data packet and a non-important data packet. For another example, the plurality of types of data packets may include a delay-critical data packet and a delay-non-critical data packet. In this embodiment of this application, a basis for obtaining the plurality of types of data packets through division may not be limited. In other words, as long as there are different types of data packets and different types of data packets have different QoS parameters, the data packets may be scheduled by using the method in this embodiment of this application.

It should be noted that the "type" in this embodiment of this application may alternatively be replaced with another possible word, for example, a "group", a "subflow", or a "sub-QoS flow". This is not specifically limited.

(3) The configuration information of the first QoS flow is described.

The configuration information of the first QoS flow may include the QoS parameters of the first QoS flow, and optionally, may further include an identifier of the first QoS flow and identifiers of the plurality of types of data packets supported by the first QoS flow. The QoS parameters of the first QoS flow may include the QoS parameters respectively corresponding to the plurality of types. For example, the plurality of types of data packets supported by the first QoS flow include a first type, a second type, and a third type. The QoS parameters of the first QoS flow may include a group of QoS parameters corresponding to the first type (referred to as first QoS parameters), a group of QoS parameters corresponding to the second type (referred to as second QoS parameters), and a group of QoS parameters corresponding to the third type (referred to as third QoS parameters).

In an example, the configuration information of the first QoS flow may include the identifier of the first QoS flow, and correspondences shown in Table 1 between the QoS parameters and the identifiers of the plurality of types of data packets supported by the first QoS flow.

TABLE 1

Example of the correspondence between the identifier of the type and the QoS parameter

| Identifiers of the plurality of types | QoS parameters corresponding to the plurality of types |
|---|---|
| Identifier of the first type | First QoS parameter |
| Identifier of the second type | Second QoS parameter |
| Identifier of the third type | Third QoS parameter |

For example, a first-type data packet may be a data packet corresponding to an I frame, a second-type data packet may be a data packet corresponding to a P frame, and a third-type data packet may be a data packet corresponding to a B frame. The first type (namely, the I frame) is used as an example. The identifier of the I frame may be information used to identify the I frame. This is not specifically limited.

For example, the first QoS parameter corresponding to the first type is used as an example. The first QoS parameter may include at least one of the following: first information, where the first information indicates whether the first-type data packet is allowed to be discarded, and second information, where the second information indicates a quantity of first-type data packets that are allowed to be discarded within a specified time. For example, when the first information indicates that the first-type data packet is disallowed to be discarded, the first QoS parameter may no longer include the second information, or the second information included in the first QoS parameter indicates that the quantity of first-type data packets that are allowed to be discarded within the specified time is 0. For another example, when the first information indicates that the first-type data packet is allowed to be discarded, the second information indicates that the quantity of first-type data packets that are allowed to be discarded within the specified time is n (n is an integer greater than 0). It should be noted that the specified time may be a period of time pre-agreed in a protocol, or may be a period of time indicated by the second information. This is not specifically limited.

Optionally, the first QoS parameter may further include other possible information, such as a 5QI, a GFBR, and an MFBR.

It should be noted that, for QoS parameters corresponding to any two of the plurality of types, the first QoS parameter and the second QoS parameter are used as an example. The first QoS parameter and the second QoS parameter may be totally different. For example, first information, second information, a 5QI, a GFBR, and an MFBR included in the first QoS parameter are totally different from first information, second information, a 5QI, a GFBR, and an MFBR included in the second QoS parameter. Alternatively, the first QoS parameter and the second QoS parameter may be partially different. For example, a 5QI, a GFBR, and an MFBR included in the first QoS parameter are the same as a 5QI, a GFBR, and an MFBR included in the second QoS parameter. However, first information and second information included in the first QoS parameter are different from first information and second information included in the second QoS parameter.

(4) That the AMF network element obtains the configuration information of the first QoS flow is described.

For example, before the AMF network element sends the configuration information of the first QoS flow to the access network device, the AMF network element needs to first obtain the configuration information of the first QoS flow. There may be a plurality of implementations in which the AMF network element obtains the configuration information of the first QoS flow. For example, the AMF network element may obtain the configuration information of the first QoS flow from an SMF network element. For example, the SMF network element may obtain, from a PCF network element, QoS parameters corresponding to different data flows in a service 1, where the service 1 includes a video data flow, the video data flow includes a plurality of types of data packets, and QoS parameters corresponding to the video data flow include QoS parameters respectively corresponding to the plurality of types. If the SMF network element determines that the first QoS flow is used to carry the video data flow, the QoS parameters of the first QoS flow are QoS parameters corresponding to the video data flow. Further, the SMF network element may send the configuration information of the first QoS flow to the AMF network element. It should be noted that, in this embodiment of this application, a specific implementation in which the PCF network element generates the QoS parameters corresponding to the different data flows in the service 1 may not be limited.

In addition, after receiving the configuration information of the first QoS flow, the access network device may process the first QoS flow based on the configuration information of the first QoS flow. For example, that the access network device processes the first QoS flow based on the configuration information of the first QoS flow may include: The access network device configures a corresponding air interface resource for the first QoS flow based on the configuration information of the first QoS flow, for example, configures a DRB corresponding to the first QoS flow.

In an example, the access network device may configure, based on the configuration information of the first QoS flow, a first DRB corresponding to the first QoS flow, and the first DRB may be associated with a plurality of logical channels. Further, the access network device may further configure a correspondence between the plurality of types supported by the first QoS flow and a plurality of logical channels. One type may correspond to one or more logical channels, or one logical channel may correspond to two or more types. For example, if the plurality of types supported by the first QoS flow include a first type, a second type, and a third type; and the plurality of logical channels associated with the first DRB include a first logical channel, a second logical channel, a third logical channel, and a fourth logical channel, the access network device may configure that the first type corresponds to the first logical channel and the second logical channel, the second type corresponds to the third logical channel, and the third type corresponds to the fourth logical channel. In this embodiment of this application, when a type corresponds to a plurality of logical channels, the plurality of logical channels may be used to transmit repeated data packets.

It should be noted that there may be a plurality of manners in which the access network device configures the correspondence between the plurality of types and the plurality of logical channels. In a possible implementation, the access network device may configure the correspondence between the plurality of types and the plurality of logical channels based on QoS parameters corresponding to the plurality of types. For example, if a QoS parameter corresponding to the first type indicates that a transmission reliability requirement of the first-type data packet is high and a QoS parameter corresponding to the second type indicates that a transmission reliability requirement of the second-type data packet is low, the first type may be duplicated/repeatedly transmitted on a plurality of logical channels, and the second type may be transmitted on a single logical channel. In other words, a quantity of logical channels corresponding to the first type may be greater than a quantity of logical channels corresponding to the second type.

It may be understood that when the first DRB is associated with one logical channel, the access network device may alternatively map the plurality of types of data packets to a same logical channel for transmission. Subsequently, the access network device may perform, at a MAC layer, downlink scheduling on the different types of data packets based on the QoS parameters corresponding to the data packets. For example, the QoS parameter corresponding to the first type indicates that a transmission reliability requirement of the first type is high. In this case, the MAC layer may transmit the data packet corresponding to the first type by using a lower-order modulation and coding scheme, or allocate more resources to transmit the data packet corresponding to the first type.

S502: A second core network device sends a first data packet in the first QoS flow to the access network device, and correspondingly, the access network device may receive the first data packet in the first QoS flow from the second core network device.

For example, the second core network device may be a UPF network element. After receiving the first data packet from an application server, the UPF network element may map the first data packet to the first QoS flow based on a packet filter set (in this case, the first data packet may be marked with the identifier of the first QoS flow) and then send the first data packet to the access network device.

In this embodiment of this application, the UPF network element may further send indication information 1 to the access network device, where the indication information 1 indicates a type of the first data packet. For example, the indication information 1 may include an identifier of the type of the first data packet. There may be a plurality of manners in which the UPF network element sends the first data packet and the indication information 1 to the access network device. For example, the UPF network element sends a second data packet to the access network device, where the second data packet includes the first data packet and the indication information 1, and the indication information 1 may be carried in a header of the second data packet. In an example, communication between the access network device and the UPF network element may comply with a specific protocol, for example, a GTP-U protocol. The GTP-U protocol is one of general packet radio service (GPRS) tunnel protocols (GTPs). Therefore, after receiving the first data packet from the application server, the UPF network element may encapsulate (for example, add a GTP-U header) the first data packet based on the GTP-U protocol to obtain the second data packet. The second data packet may be referred to as a GTP-U data packet, and the indication information 1 may be carried in a header of the GTP-U packet.

In addition, before sending the indication information 1 to the access network device, the UPF network element may first determine the type of the first data packet. There may be a plurality of manners in which the UPF network element determines the type of the first data packet. For example, when sending the first data packet to the UPF network element, the application server may indicate the type of the first data packet. For another example, the UPF network element may determine the type of the first data packet according to a preset rule. This is not specifically limited.

S503: The access network device performs downlink scheduling on the first data packet based on a QoS parameter corresponding to the type of the first data packet.

Herein, if the access network device configures the correspondence between the plurality of types supported by the first QoS flow and the plurality of logical channels, before performing downlink scheduling on the first data packet based on the QoS parameter corresponding to the type of the first data packet, the access network device may map the first data packet to the first DRB corresponding to the first QoS flow based on the identifier of the first QoS flow marked by the first data packet, and then map the first data packet to the logical channel corresponding to the first type based on the type of the first data packet.

In a possible implementation, that the access network device performs downlink scheduling on the first data packet based on the QoS parameter corresponding to the type of the first data packet may include: The access network device sends the first data packet to a terminal device based on the QoS parameter corresponding to the type of the first data packet, or the access network device discards the first data packet based on the QoS parameter corresponding to the type of the first data packet.

In an example, it is assumed that the type of the first data packet is a first type, the first type corresponds to a first QoS parameter, and first information in the first QoS parameter indicates that the first-type data packet is allowed to be discarded. If determining that at least one of the following Case 1 and Case 2 is met, the access network device may discard the first data packet; or if determining that Case 1 and Case 2 are not met, the access network device may send the first data packet to the terminal device. Case 1: Load of the access network device is heavy. For example, a quantity of terminal devices served by the access network device is greater than or equal to a quantity threshold. For another example, resource usage of the access network device is greater than or equal to a resource usage threshold. The quantity threshold and the resource usage threshold may be set based on an actual situation. This is not specifically limited. Case 2: The access network device determines, based on a PDB of the first data packet, that the first data packet exceeds a transmission delay requirement.

Further, it is assumed that the second information in the first QoS parameter indicates the quantity of first-type data packets that are allowed to be discarded within the specified time, when the access network device determines whether to discard the first data packet, the following limit needs to be met: If a quantity of data packets discarded within the specified time is greater than or equal to the quantity of data packets allowed to be discarded, the access network device may not discard the first data packet, and send the first data packet to the terminal device.

According to the method, the QoS parameters of the first QoS flow can include the QoS parameters respectively corresponding to the plurality of types, so that the access network device can perform, after receiving a data packet in the first QoS flow, downlink scheduling on the data packet based on a QoS parameter corresponding to a type of the data packet. This implements differentiated scheduling on different types of data packets in the same QoS flow.

In Embodiment 1, the access network device is used as an entire device for description. In some possible cases, the access network device may alternatively include separate nodes, such as the CU and the DU, as shown in FIG. 2*b*.

The following describes, based on the CU and the DU shown in FIG. 2*b*, the communication method provided in embodiments of this application with reference to Embodiment 2 and Embodiment 3.

Embodiment 2

Figure 6:
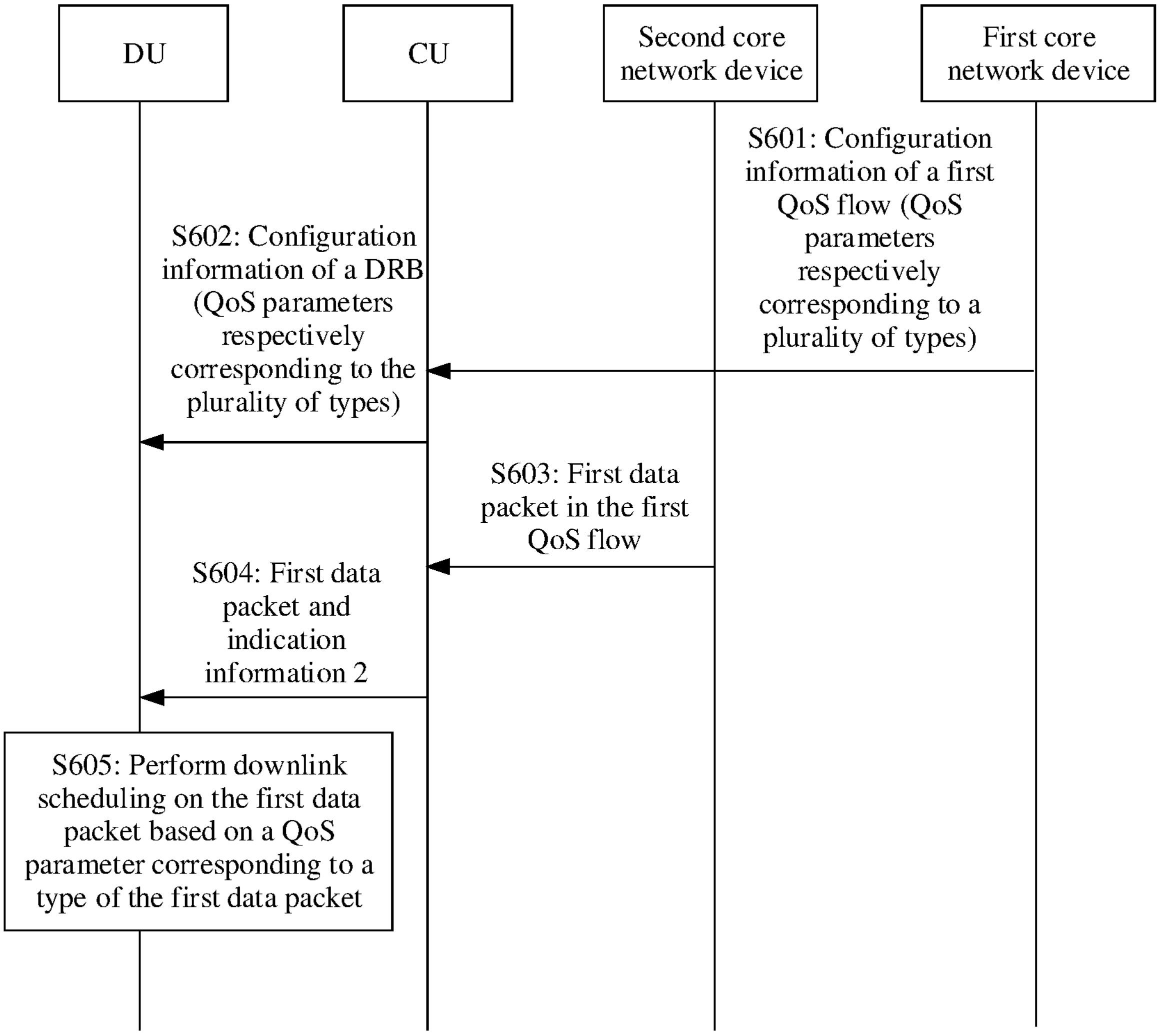
FIG. 6 is a schematic flowchart corresponding to a communication method according to Embodiment 2 of this application.

FIG. 6 is a schematic flowchart corresponding to a communication method according to Embodiment 2 of this application. As shown in FIG. 6, the method includes the following steps.

S601: A first core network device sends configuration information of a first QoS flow to a CU, and correspondingly, the CU may receive the configuration information of the first QoS flow. The configuration information of the first QoS flow includes QoS parameters of the first QoS flow, the first QoS flow supports a plurality of types of data packets, and the QoS parameters of the first QoS flow include QoS parameters respectively corresponding to the plurality of types. In addition, after receiving the configuration information of the first QoS flow, the CU may process the first QoS flow based on the configuration information of the first QoS flow. For example, that the CU processes the first QoS flow based on the configuration information of the first QoS flow may include: The CU configures a corresponding air interface resource for the first QoS flow based on the configuration information of the first QoS flow, for example, configures a DRB corresponding to the first QoS flow.

For example, for a related implementation of S6*oi*, refer to the description of S501 in Embodiment 1, and details are not described again.

S602: The CU sends configuration information of the DRB corresponding to the first QoS flow to the DU, and correspondingly, the DU may receive the configuration information of the DRB corresponding to the first QoS flow. The configuration information of the DRB includes the QoS parameters respectively corresponding to the plurality of types.

In an example, the configuration information of the DRB may include correspondences between identifiers of the plurality of types and the QoS parameters, for example, as shown in Table 1.

S603: A second core network device sends a first data packet in the first QoS flow to the CU, and correspondingly, the CU may receive the first data packet in the first QoS flow from the second core network device.

For example, for a related implementation of S603, refer to the description of S502 in Embodiment 1, and details are not described again.

S604: The CU sends the first data packet and indication information 2 to the DU, and correspondingly, the DU may receive the first data packet and the indication information 2.

Herein, there may be a plurality of manner in which the CU sends the first data packet and the indication information 2 to the DU. For example, the CU sends a third data packet to the DU, where the third data packet may include the first data packet and the indication information 2, and the indication information 2 may be carried in a header of the third data packet. In an example, the third data packet may be a GTP-U data packet, and the indication information 2 may be carried in a GTP-U header of the third data packet.

S605: The DU performs downlink scheduling on the first data packet based on a QoS parameter corresponding to a type of the first data packet Herein, for a related implementation in which the DU performs downlink scheduling on the first data packet based on the QoS parameter corresponding to the type of the first data packet, refer to the description of performing, by the access network device, downlink scheduling on the first data packet based on the QoS parameter corresponding to the type of the first data packet in Embodiment 1, and details are not described again.

According to the foregoing method, the CU can send, to the DU, the QoS parameters respectively corresponding to the plurality of types, so that the DU can perform, after receiving a data packet, downlink scheduling on the data packet based on a QoS parameter corresponding to a type of the data packet. This implements differentiated scheduling on different types of data packets in the same QoS flow.

Embodiment 3

Figure 7:
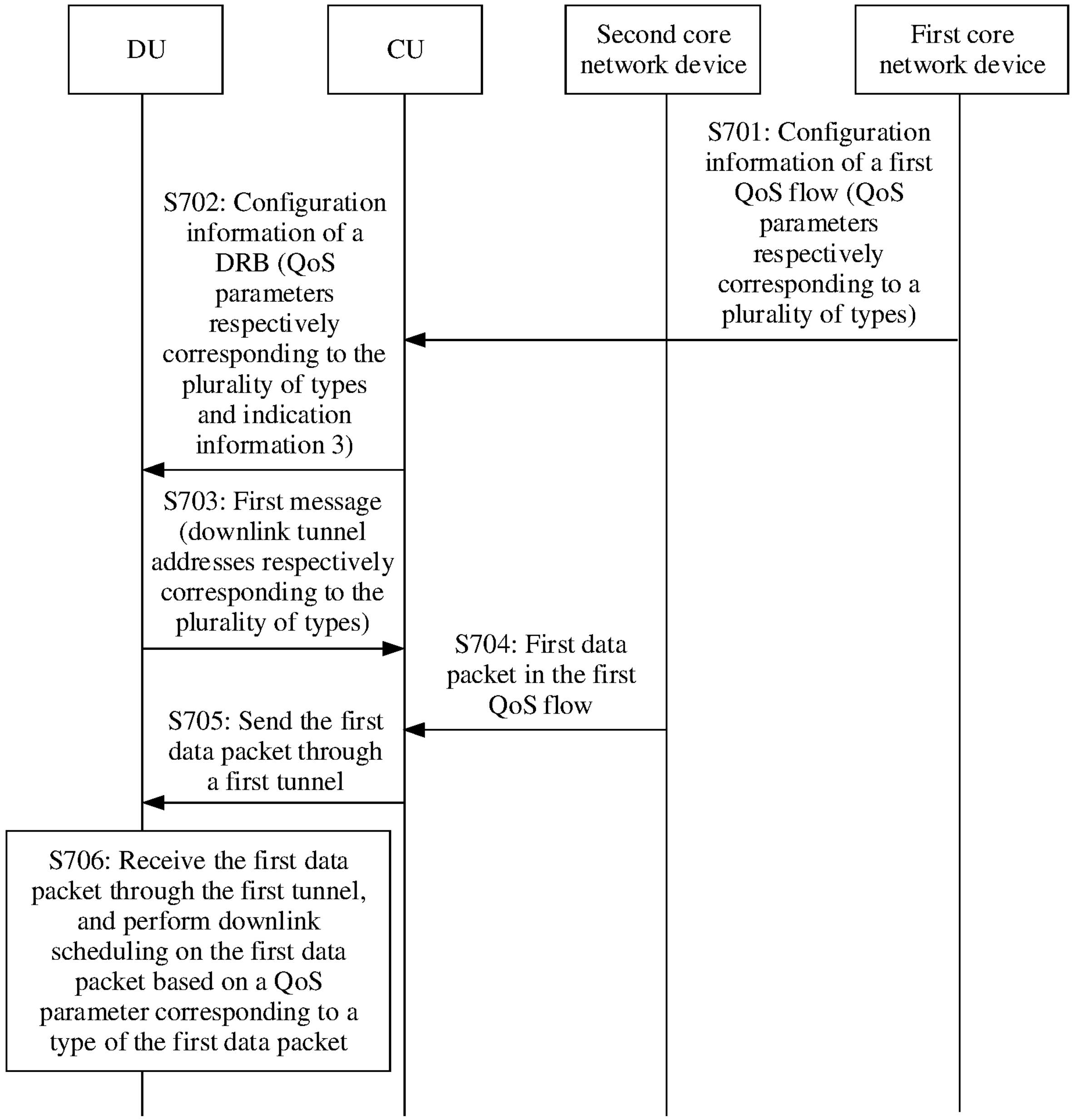
FIG. 7 is a schematic flowchart corresponding to a communication method according to Embodiment 3 of this application.

FIG. 7 is a schematic flowchart corresponding to a communication method according to Embodiment 3 of this application. As shown in FIG. 7, the method includes the following steps.

S701: A first core network device sends configuration information of a first QoS flow to a CU, and correspondingly, the CU receives the configuration information of the first QoS flow. The configuration information of the first QoS flow includes QoS parameters of the first QoS flow, the first QoS flow supports a plurality of types of data packets, and the QoS parameters of the first QoS flow include QoS parameters respectively corresponding to the plurality of types. In addition, after receiving the configuration information of the first QoS flow, the CU may process the first QoS flow based on the configuration information of the first QoS flow. For example, that the CU processes the first QoS flow based on the configuration information of the first QoS flow may include: The CU configures a corresponding air interface resource for the first QoS flow based on the configuration information of the first QoS flow, for example, configures a DRB corresponding to the first QoS flow.

For example, for a related implementation of S701, refer to the description of S501 in Embodiment 1, and details are not described again.

S702: The CU sends configuration information of the DRB corresponding to the first QoS flow to a DU, and correspondingly, the DU receives the configuration information of the DRB corresponding to the first QoS flow. The configuration information of the DRB includes the QoS parameters respectively corresponding to the plurality of types, and optionally, may further include indication information 3, where the indication information 3 indicates quantities of downlink tunnel addresses respectively corresponding to the plurality of types.

S703: The DU sends a first message to the CU, where the first message includes the downlink tunnel addresses respectively corresponding to the plurality of types.

In this embodiment of this application, for one DRB, one or more tunnels can be established between the CU and the DU, where the tunnel is used to transmit a data packet at a PDCP layer of the CU to an RLC entity of the DU (which may be understood as downlink transmission); and/or transmit a data packet received by an RLC entity of the DU to a PDCP entity of the CU (which may be understood as uplink transmission). Each tunnel may include an uplink tunnel address and a downlink tunnel address. The uplink tunnel address refers to an address of the tunnel on a CU side, and the downlink tunnel address refers to an address of the tunnel on a DU side.

That the indication information 3 indicates the quantities of downlink tunnel addresses respectively corresponding to the plurality of types may also be replaced with another possible description. For example, that the indication information 3 indicates the quantities of downlink tunnel addresses respectively corresponding to the plurality of types may be replaced with that the indication information 3 indicates whether the plurality of types of data packets need to be repeatedly transmitted. In addition, when indicating that a type of data packet needs to be repeatedly transmitted, the indication information 3 may further indicate a quantity of times of repeated transmission. A first type is used as an example. If the indication information 3 indicates that a first-type data packet does not need to be repeatedly transmitted, it indicates that a quantity of downlink tunnel addresses corresponding to the first type is 1; or if the indication information 3 indicates that a first-type data packet needs to be repeatedly transmitted, and a quantity of times of repeated transmission is k, it indicates that a quantity of downlink tunnel addresses corresponding to the first type is k.

For another example, that the indication information 3 indicates the quantities of downlink tunnel addresses respectively corresponding to the plurality of types may be replaced with that the indication information 3 indicates quantities of logical channels respectively corresponding to the plurality of types. For example, each downlink tunnel address may correspond to one logical channel, and a correspondence between a downlink tunnel address and a logical channel may be determined by the DU. Optionally, the DU may send the correspondence between the downlink tunnel address and the logical channel to the CU; or the DU may separately send, to the CU, an identifier of a logical channel and/or configuration information of a logical channel corresponding to the first type; or the DU may send, to the CU, only an identifier of a primary logical channel and/or configuration information of a primary logical channel in logical channels corresponding to the first type, so that the CU generates an RRC message based on related information, and sends the RRC message to a terminal device, and then, the terminal device can learn of the related information, and receive the data packet of the first type.

It should be noted that the foregoing repeated transmission may refer to repeated transmission at the PDCP layer. Specifically, a data packet is copied at the PDCP layer into a plurality of same data packets (namely, repeated packets), and then the plurality of data packets are separately submitted to a plurality of different RLC layer entities for transmission. Then, the data packets are transmitted to a MAC layer entity through different logical channels. It should be noted that, re-transmission usually refers to retransmission, but repeated transmission (duplication transmission) in embodiments of this application does not refer to retransmission. Retransmission refers to sending a same data packet again after sending failure of the same data packet, or consecutively sending a same data packet for a plurality of times. Repeated transmission refers to replicating a data packet into a plurality of data packets and separately transmitting the data packets through a plurality of logical channels. "Repeated" herein may also be understood as "replication".

In this embodiment of this application, there may be a plurality of manners in which the indication information 3 indicates the quantities of downlink tunnel addresses respectively corresponding to the plurality of types. The following describes several possible manners with reference to Example 1 to Example 4.

Example 1

The indication information 3 may include uplink tunnel addresses respectively corresponding to the plurality of types, and each of the plurality of types may correspond to one or more uplink tunnel addresses. In other words, the indication information 3 implicitly indicates, by indicating quantities of uplink tunnel addresses respectively corresponding to the plurality of types, quantities of downlink tunnel addresses respectively corresponding to the plurality of types.

The first type is used as an example. When the first type corresponds to one uplink tunnel address, it indicates that a quantity of downlink tunnel addresses corresponding to the first type is 1; and in this case, it may be understood that the indication information 3 implicitly indicates that the first-type data packet is not repeatedly transmitted; or when the first type corresponds to two uplink tunnel addresses, it indicates that a quantity of downlink tunnel addresses corresponding to the first type is 2; and in this case, it may be understood that the indication information 3 implicitly indicates that the first-type data packet needs to be repeatedly transmitted, and a quantity of times of repeated transmission is 2. In other words, a quantity of uplink tunnel addresses corresponding to the first type included in the indication information 3 is a quantity of downlink tunnel addresses corresponding to the first type or a quantity of logical channels corresponding to the first type. It should be noted that the uplink tunnel address corresponding to the first type may be an address, on the CU side, of a tunnel that carries the first-type data packet when the DU sends the first-type data packet to the CU, and the downlink tunnel address corresponding to the first type may be an address, on the DU side, of a tunnel that carries the first-type data packet when the CU sends the first-type data packet to the DU.

In this example, it is assumed that the plurality of types includes a first type, a second type, and a third type; the first type corresponds to a first QoS parameter, the second type corresponds to a second QoS parameter, and the third type corresponds to a third QoS parameter; and an uplink tunnel address corresponding to the first type includes an uplink tunnel address 1, uplink tunnel addresses corresponding to the second type include an uplink tunnel address 2 and an uplink tunnel address 3, and an uplink tunnel address corresponding to the third type includes an uplink tunnel address 4, the configuration information of the DRB may include content shown in Table 2.

TABLE 2

Example of the content included in the configuration information of the DRB

| Identifiers of the plurality of types | QoS parameters respectively corresponding to the plurality of types | Uplink tunnel addresses respectively corresponding to the plurality of types |
|---|---|---|
| Identifier of the first type | First QoS parameter | Uplink tunnel address 1 |
| Identifier of the second type | Second QoS parameter | Uplink tunnel address 2 and uplink tunnel address 3 |
| Identifier of the third type | Third QoS parameter | Uplink tunnel address 4 |

Correspondingly, after receiving the configuration information of the DRB, the DU may allocate a downlink tunnel address to each uplink tunnel address. For example, a downlink tunnel address 1 is allocated to the uplink tunnel address 1, a downlink tunnel address 2 is allocated to the uplink tunnel address 2, a downlink tunnel address 3 is allocated to the uplink tunnel address 3, and a downlink tunnel address 4 is allocated to the uplink tunnel address 4. Further, the DU sends the first message to the CU, where the first message may include the downlink tunnel addresses respectively corresponding to the plurality of types. Optionally, the first message may further include a correspondence between a downlink tunnel address and an uplink tunnel address. Table 3 shows an example of content included in the first message.

TABLE 3

Example of content included in the first message

| Identifiers of the plurality of types | Uplink tunnel addresses respectively corresponding to the plurality of types | Downlink tunnel addresses respectively corresponding to the plurality of types |
|---|---|---|
| Identifier of the first type | Uplink tunnel address 1 | Downlink tunnel address 1 |
| Identifier of the second type | Uplink tunnel address 2<br>Uplink tunnel address 3 | Downlink tunnel address 2<br>Downlink tunnel address 3 |
| Identifier of the third type | Uplink tunnel address 4 | Downlink tunnel address 4 |

Example 2

The indication information 3 may include quantities of downlink tunnel addresses (or uplink tunnel addresses) respectively corresponding to the plurality of types. Each of the plurality of types may correspond to one or more downlink tunnel addresses. The first type is used as an example. If the quantity of downlink tunnel addresses corresponding to the first type included in the indication information 3 is 1, it may be understood that the indication information 3 implicitly indicates that the first-type data packet is not repeatedly transmitted, or the indication information 3 implicitly indicates that the quantity of logical channels corresponding to the first type is 1; or if the quantity of downlink tunnel addresses corresponding to the first type included in the indication information 3 is k (k is an integer greater than 1), it may be understood that the indication information 3 implicitly indicates that the first-type data packet needs to be repeatedly transmitted, or the indication information 3 implicitly indicates that the quantity of logical channels corresponding to the first type is k.

In this example, it is assumed that the plurality of types includes a first type, a second type, and a third type, the first type corresponds to a first QoS parameter, the second type corresponds to a second QoS parameter, and the third type corresponds to a third QoS parameter, and a quantity of downlink tunnel addresses corresponding to the first type is 1, a quantity of downlink tunnel addresses corresponding to the second type is 2, and a quantity of downlink tunnel addresses corresponding to the third type is 4, the configuration information of the DRB may include content shown in Table 4.

TABLE 4

| Example of the content included in the configuration information of the DRB | | |
|---|---|---|
| Identifiers of the plurality of types | QoS parameters respectively corresponding to the plurality of types | Quantities of downlink tunnel addresses respectively corresponding to the plurality of types |
| Identifier of the first type | First QoS parameter | 1 |
| Identifier of the second type | Second QoS parameter | 2 |
| Identifier of the third type | Third QoS parameter | 1 |

Correspondingly, after receiving the configuration information of the DRB, the DU may allocate downlink tunnel addresses based on the quantities of downlink tunnel addresses respectively corresponding to the plurality of types. For example, a downlink tunnel address 1 is allocated to the first type, a downlink tunnel address 2 and a downlink tunnel address 3 are allocated to the second type, and a downlink tunnel address 4 is allocated to the third type. Further, the first message is sent to the CU, where the first message may include the downlink tunnel addresses respectively corresponding to the plurality of types. Table 5 shows an example of content included in the first message.

TABLE 5

| Example of the content included in the first message | |
|---|---|
| Identifiers of the plurality of types | Downlink tunnel addresses respectively corresponding to the plurality of types |
| Identifier of the first type | Downlink tunnel address 1 |
| Identifier of the second type | Downlink tunnel address 2 |
| | Downlink tunnel address 3 |
| Identifier of the third type | Downlink tunnel address 4 |

Example 3

The indication information 3 may include quantities of logical channels respectively corresponding to the plurality of types. Each of the plurality of types may correspond to one or more logical channels. The first type is used as an example. If a quantity of logical channels corresponding to the first type included in the indication information 3 is 1, it may be understood that the indication information 3 implicitly indicates that a quantity of downlink tunnel addresses corresponding to the first type is 1, or the indication information 3 implicitly indicates that the first-type data packet is not repeatedly transmitted; or if a quantity of logical channels corresponding to the first type included in the indication information 3 is k, it may be understood that the indication information 3 implicitly indicates that a quantity of downlink tunnel addresses corresponding to the first type is k, or the indication information 3 implicitly indicates that the first-type data packet needs to be repeatedly transmitted.

Example 4

The indication information 3 may include indication information respectively corresponding to the plurality of types. For example, the plurality of types include a first type, a second type, and a third type. In this case, the indication information 3 may include indication information 31 corresponding to the first type, indication information 32 corresponding to the second type, and indication information 33 corresponding to the third type. The first type is used as an example. The indication information 31 corresponding to the first type indicates whether the first-type data packet needs to be repeatedly transmitted. In this case, it may be understood that the indication information 3 explicitly indicates whether the plurality of types of data packets need to be repeatedly transmitted.

It should be noted that for specific implementations of Example 3 and Example 4, refer to Example 2, and details are not described again.

S704: A second core network device sends a first data packet in the first QoS flow to the CU, and correspondingly, the CU may receive the first data packet.

For example, for a related implementation of S704, refer to the description of S502 in Embodiment 1, and details are not described again.

S705: The CU sends the first data packet to the DU through a first tunnel, and correspondingly, the DU may receive the first data packet through the first tunnel. A downlink tunnel address corresponding to the first tunnel is a downlink tunnel address corresponding to a type of the first data packet.

Herein, after receiving the first data packet, the CU may learn of the type of the first data packet. For example, the type of the first data packet is a first type. In this case, because a downlink tunnel address corresponding to the first type is a downlink tunnel address 1, the CU may send the first data packet to the DU through a tunnel (for example, the tunnel 1) whose downlink tunnel address is the downlink tunnel address 1. For another example, the type of the first data packet is a second type. In this case, because downlink tunnel addresses corresponding to the second type include a downlink tunnel address 2 and a downlink tunnel address 3, the CU may duplicate the first data packet into two first data packets, and send the first data packets to the DU separately through a tunnel whose downlink tunnel address is the downlink tunnel address 2 (for example, a tunnel 2) and a tunnel whose downlink tunnel address is the downlink tunnel address 3 (for example, a tunnel 3).

S706: The DU performs downlink scheduling on the first data packet based on a QoS parameter corresponding to the type of the first data packet.

Herein, it is assumed that the type of the first data packet is the first type. After receiving the first data packet through the first tunnel, the DU may map the first data packet to the corresponding logical channel based on a correspondence between the logical channel and the downlink tunnel address corresponding to the first tunnel. Further, because the downlink tunnel address corresponding to the first tunnel is the downlink tunnel address corresponding to the first type, the DU may perform downlink scheduling on the first data packet based on the QoS parameter corresponding to the first type.

According to the method, the CU may send the configuration information of the DRB to the DU, where the configuration information of the DRB includes the QoS parameters respectively corresponding to the plurality of types and the indication information 3, and the indication information 3 indicates the quantities of downlink tunnel addresses respectively corresponding to the plurality of types. Then, the DU may separately allocate downlink tunnel addresses to the plurality of types based on the configuration information of the DRB, and feed back the downlink tunnel addresses to the CU. In this way, the CU may send the first data packet to the DU through a corresponding tunnel (for example, the first tunnel) based on the type of the first data packet. After receiving the first data packet through the first tunnel, the DU may perform downlink scheduling on the first data packet based on the corresponding QoS parameter, so as to implement differentiated scheduling on different types of data packets in the same QoS flow.

For Embodiment 1 to Embodiment 3, it should be noted that:

(1) Step numbers of the flowcharts described in Embodiment 1 to Embodiment 3 are merely examples of performing the procedure, and do not constitute a limitation on a sequence of performing the steps. In embodiments of this application, there is no strict execution sequence among steps that do not have a time sequence dependency on each other. In addition, not all the steps shown in the flowcharts are mandatory steps, and some steps may be added to or deleted from the flowcharts based on an actual requirement.

(2) The foregoing focuses on differences between different embodiments in Embodiment 1 to Embodiment 3. For other content except the differences, mutual reference may be made among Embodiment 1 to Embodiment 3.

(3) Embodiment 1 to Embodiment 3 use some messages in a 5G communication system. However, in specific implementation, different messages or message names may be used, which is not limited in embodiments of this application.

The foregoing mainly describes the solutions provided in embodiments of this application from a perspective of device interaction. It may be understood that, to implement the foregoing functions, the access network device, the core network device, or the terminal device may include a corresponding hardware structure and/or a software module for performing each function. A person skilled in the art should be easily aware that, in embodiments of this application, the units and algorithm steps in the examples described with reference to embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the access network device, the core network device, or the terminal device may be divided into functional units based on the method examples. For example, each functional unit may be obtained through division based on each corresponding function, or two or more functions may be integrated into one unit. The integrated unit may be implemented in a form of hardware, or may be implemented in a form of a software functional unit.

Figure 8:
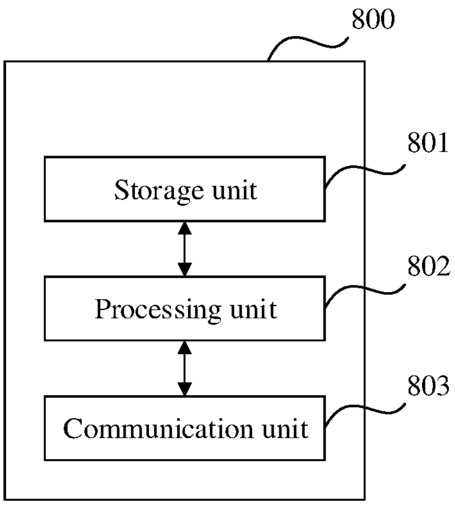
FIG. 8 is a block diagram of a possible example of an apparatus according to an embodiment of this application.

When an integrated unit is used, FIG. 8 is a block diagram of a possible example of an apparatus according to an embodiment of this application. As shown in FIG. 8, the apparatus 800 may include a processing unit 802 and a communication unit 803. The processing unit 802 is configured to control and manage actions of the apparatus 800. The communication unit 803 is configured to support communication between the apparatus 800 and another device. Optionally, the communication unit 803 is also referred to as a transceiver unit, and may include a receiving unit and/or a sending unit, respectively configured to perform a receiving operation and a sending operation. The apparatus 800 may further include a storage unit 801, configured to store program code and/or data of the apparatus 800.

The apparatus 800 may be the access network device in the foregoing embodiment, or may be a chip disposed in the access network device. The processing unit 802 may support the apparatus 800 in performing actions of the access network device in the foregoing method examples. Alternatively, the processing unit 802 mainly performs an internal action of the access network device in the method examples, and the communication unit 803 (including the receiving unit and the sending unit) may support communication between the apparatus 800 and another device.

Specifically, in an embodiment, the receiving unit is configured to: receive configuration information of a first QoS flow from a first core network device, where the configuration information of the first QoS flow includes QoS parameters of the first QoS flow, and the first QoS flow supports a plurality of types of data packets, and the QoS parameters of the first QoS flow include QoS parameters respectively corresponding to the plurality of types; and receive a first data packet in the first QoS flow from a second core network device. The processing unit is configured to perform downlink scheduling on the first data packet based on a QoS parameter corresponding to a type of the first data packet.

In a possible design, the receiving unit is further configured to receive first indication information from the second core network device, where the first indication information indicates the type of the first data packet.

In a possible design, the first data packet and the first indication information are carried in a second data packet from the second core network device, and the first indication information is carried in a header of the second data packet.

In a possible design, the processing unit is further configured to map, based on a correspondence between the type of the first data packet and a logical channel, the first data packet to the logical channel corresponding to the type of the first data packet.

In a possible design, the plurality of types include a first type, and a QoS parameter corresponding to the first type includes at least one of the following: first information, where the first information indicates whether a first-type data packet is allowed to be discarded; and second information, where the second information indicates a quantity of first-type data packets that are allowed to be discarded within a specified time.

The apparatus 800 may be the CU in the foregoing embodiment or a chip disposed in the CU. The processing unit 802 may support the apparatus 800 in performing actions of the CU in the foregoing method examples. Alternatively, the processing unit 802 mainly performs an internal action of the CU in the method examples, and the communication unit 803 (including the receiving unit and the sending unit) may support communication between the apparatus 800 and another device.

Specifically, in an embodiment, the receiving unit is configured to: receive configuration information of a first QoS flow from a first core network device, where the configuration information of the first QoS flow includes QoS parameters of the first QoS flow, the first QoS flow supports a plurality of types of data packets, and the QoS parameters of the first QoS flow include QoS parameters respectively corresponding to the plurality of types. The sending unit is configured to send configuration information of a DRB to a DU, where the configuration information of the DRB includes the QoS parameters respectively corresponding to the plurality of types.

In a possible design, the receiving unit is further configured to receive a first data packet in the first QoS flow from a second core network device. The sending unit is further configured to send the first data packet and second indication information to the DU, where the second indication information indicates a type of the first data packet.

In a possible design, the sending unit is specifically configured to send a third data packet to the DU, where the third data packet includes the first data packet and the second indication information, and the second indication information is carried in a header of the third data packet.

In a possible design, the sending unit is further configured to send third indication information to the DU, where the third indication information indicates quantities of downlink tunnel addresses respectively corresponding to the plurality of types. The receiving unit is further configured to receive a first message from the DU, where the first message includes downlink tunnel addresses respectively corresponding to the plurality of types.

In a possible design, the receiving unit is further configured to receive a first data packet in the first QoS flow from the second core network device. The sending unit is further configured to send the first data packet to the DU through a first tunnel, where a downlink tunnel address corresponding to the first tunnel is a downlink tunnel address corresponding to the type of the first data packet.

The apparatus 800 may be the DU in the foregoing embodiment or a chip disposed in the DU. The processing unit 802 may support the apparatus 800 in performing actions of the DU in the foregoing method examples. Alternatively, the processing unit 802 mainly performs an internal action of the DU in the method examples, and the communication unit 803 (including the receiving unit and the sending unit) may support communication between the apparatus 800 and another device.

Specifically, in an embodiment, the receiving unit is configured to: receive configuration information of a DRB from a CU, where the DRB corresponds to a first QoS flow, the first QoS flow supports a plurality of types of data packets, and the configuration information of the DRB includes QoS parameters respectively corresponding to the plurality of types; and receive a first data packet from the CU. The processing unit is configured to perform downlink scheduling on the first data packet based on a QoS parameter corresponding to a type of the first data packet.

In a possible design, the receiving unit is further configured to receive second indication information from the CU, where the second indication information indicates the type of the first data packet.

In a possible design, the first data packet and the second indication information are carried in a third data packet from the CU, and the second indication information is carried in a header of the third data packet.

In a possible design, the receiving unit is further configured to receive third indication information from the CU, where the third indication information indicates quantities of downlink tunnel addresses respectively corresponding to the plurality of types. The sending unit is configured to send a first message to the CU, where the first message includes downlink tunnel addresses respectively corresponding to the plurality of types.

In a possible design, the receiving unit is further configured to receive the first data packet from the CU through a first tunnel, where a downlink tunnel address corresponding to the first tunnel is a downlink tunnel address corresponding to the type of the first data packet.

The apparatus 800 may be the first core network device in the foregoing embodiment, or may be a chip disposed in the first core network device. The processing unit 802 may support the apparatus 800 in performing actions of the first core network device in the foregoing method examples. Alternatively, the processing unit 802 mainly performs an internal action of the first core network device in the method examples, and the communication unit 803 may support communication between the apparatus 800 and another device.

Specifically, in an embodiment, the processing unit 802 is configured to determine configuration information of a first QoS flow. The communication unit 803 is configured to send the configuration information of the first QoS flow to an access network device or a CU, where the configuration information of the first QoS flow includes QoS parameters of the first QoS flow, the first QoS flow supports a plurality of types of data packets, and the QoS parameters of the first QoS flow include QoS parameters respectively corresponding to the plurality of types.

The apparatus 800 may be the second core network device in the foregoing embodiment, or may be a chip disposed in the second core network device. The processing unit 802 may support the apparatus 800 in performing actions of the second core network device in the foregoing method examples. Alternatively, the processing unit 802 mainly performs an internal action of the second core network device in the method examples, and the communication unit 803 may support communication between the apparatus 800 and another device.

Specifically, in an embodiment, the communication unit 803 is configured to: receive a first data packet from an application server, and send the first data packet and indication information to an access network device or a CU, where the indication information indicates a type of the first data packet.

It should be understood that division into units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, operations in the foregoing methods or the foregoing units may be implemented by using a hardware integrated logic circuit in the processor element, or may be implemented in a form in which the processing element invokes software.

In an example, a unit in any one of the foregoing apparatuses may be one or more integrated circuits configured to implement the foregoing methods, for example, one or more application-specific integrated circuits (ASICs), one or more microprocessors (DSPs), one or more field programmable gate arrays (FPGAs), or a combination of at least two of these forms of integrated circuits. For another example, when the units in the apparatus may be implemented in a form in which a processing element schedules a program, the processing element may be a processor, for example, a general-purpose central processing unit (CPU) or another processor that can invoke the program. For still another example, the units may be integrated and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal to another chip or apparatus.

Figure 9:
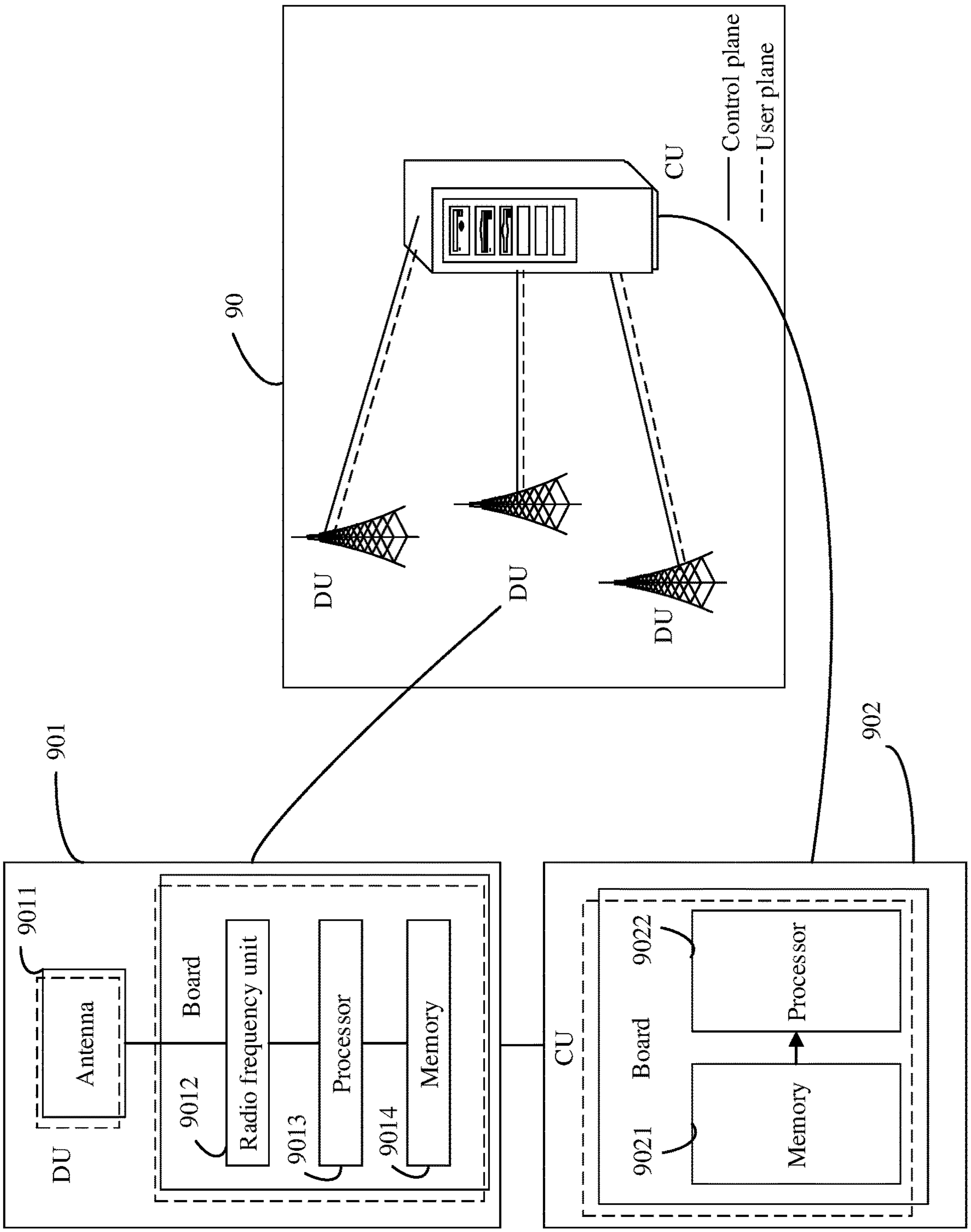
FIG. 9 is a schematic diagram of a structure of an access network device according to an embodiment of this application.

FIG. 9 is a schematic diagram of a structure of an access network device according to an embodiment of this application. The access network device (or a base station) may be used in the system architecture shown in FIG. 1, to perform functions of the access network device in the foregoing method embodiments. The access network device 90 may include one or more DUs 901 and one or more CUs 902. The DU 901 may include at least one antenna 9011, at least one radio frequency unit 9012, at least one processor 9013, and at least one memory 9014. The DU 901 is mainly configured to receive and send a radio frequency signal, perform conversion between a radio frequency signal and a baseband signal, and perform partial baseband processing. The CU 902 may include at least one processor 9022 and at least one memory 9021.

The CU 902 is mainly configured to: perform baseband processing, control the access network device, and the like. The DU 901 and the CU 902 may be physically disposed together, or may be physically separated, that is, the base station may be a distributed base station. The CU 902 is a control center of the access network device, may also be referred to as a processing unit, and is mainly configured to complete a baseband processing function. For example, the CU 902 may be configured to control the access network device to perform operation procedures related to the access network device in the foregoing method embodiments.

In addition, optionally, the access network device 90 may include one or more radio frequency units, one or more DUs, and one or more CUs. The DU may include at least one processor 9013 and at least one memory 9014, the radio frequency unit may include at least one antenna 9011 and at least one radio frequency unit 9012, and the CU may include at least one processor 9022 and at least one memory 9021.

In an instance, the CU 902 may include one or more boards. A plurality of boards may jointly support a radio access network (for example, a 5G network) with a single access indication, or may separately support radio access networks (for example, an LTE network, a 5G network, or another network) with different access standards. The memory 9021 and the processor 9022 may serve one or more boards. In other words, a memory and a processor may be disposed on each board. Alternatively, a plurality of boards may share a same memory and a same processor. In addition, a necessary circuit may be disposed on each board. The DU 901 may include one or more boards. A plurality of boards may jointly support a radio access network (for example, a 5G network) with a single access indication, or may separately support radio access networks (for example, an LTE network, a 5G network, or another network) with different access standards. The memory 9014 and the processor 9013 may serve one or more boards. In other words, a memory and a processor may be disposed on each board. Alternatively, a plurality of boards may share a same memory and a same processor. In addition, a necessary circuit may be disposed on each board.

The access network device shown in FIG. 9 can implement processes related to the access network device in the foregoing method embodiments, the CU shown in FIG. 9 can implement processes related to the CU in the foregoing method embodiments, and the DU shown in FIG. 9 can implement processes related to the DU in the foregoing method embodiments. Operations and/or functions of modules in the access network device or the CU or the DU shown in FIG. 9 are respectively intended to implement corresponding procedures in the foregoing method embodiments. For details, refer to the descriptions in the foregoing method embodiments. To avoid repetition, detailed descriptions are appropriately omitted herein.

Figure 10:
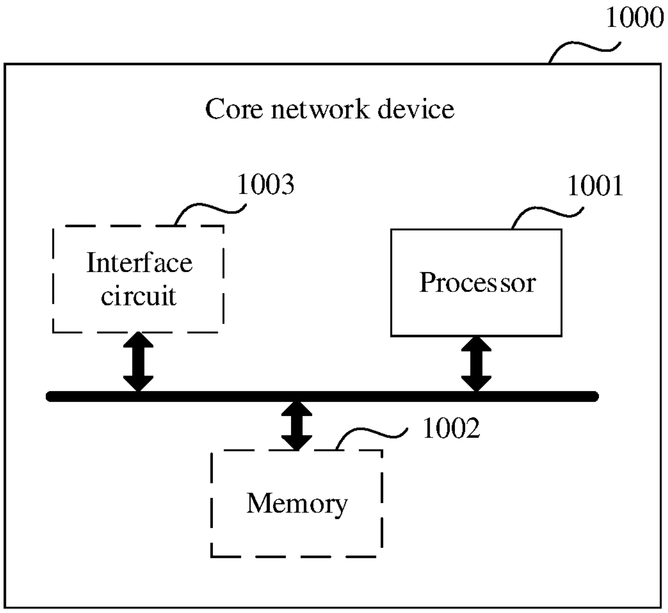
FIG. 10 is a schematic diagram of a structure of a core network device according to an embodiment of this application.

FIG. 10 is a schematic diagram of a structure of a core network device according to an embodiment of this application. The core network device may be the first core network device or the second core network device in the foregoing embodiments, and is configured to implement an operation of the first core network device or the second core network device in the foregoing embodiments.

As shown in FIG. 10, a core network device 1000 may include a processor 1001, a memory 1002, and an interface circuit 1003. The processor 1001 may be configured to process a communication protocol and communication data, and control a communication apparatus. The memory 1002 may be configured to store a program and data, and the processor 1001 may perform, based on the program, the method performed by the SMF network element or the AMF network element in embodiments of this application. The interface circuit 1003 may be used for the core network device 1000 to communicate with another device, where the communication may be wired communication or wireless communication, and the interface circuit may be, for example, a service-oriented communication interface.

The memory 1002 may alternatively be externally connected to the core network device 1000. In this case, the core network device 1000 may include an interface circuit 1003 and a processor 1001. The interface circuit 1003 may alternatively be externally connected to the core network device 1000. In this case, the core network device 1000 may include a memory 1002 and a processor 1001. When both the interface circuit 1003 and the memory 1002 are externally connected to the core network device 1000, the core network device 1000 may include a processor 1001.

The core network device shown in FIG. 10 can implement processes related to the first core network device or the second core network device in the foregoing method embodiments. Operations and/or functions of modules in the core network device shown in FIG. 10 are respectively used to implement corresponding procedures in the foregoing method embodiments. For details, refer to the descriptions in the foregoing method embodiments. To avoid repetition, detailed descriptions are appropriately omitted herein.

The terms "system" and "network" may be used interchangeably in embodiments of this application. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, "at least one of A, B, and C" includes A, B, C, AB, AC, BC, or ABC. In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An apparatus, comprising:
- a receiver, configured to:
  - receive configuration information of a first quality of service (QoS) flow from a first core network device, wherein the configuration information of the first QoS flow comprises QoS parameters of the first QoS flow, the first QoS flow supports a plurality of types of data packets, and the QoS parameters of the first QoS flow comprise QoS parameters respectively corresponding to different types of the plurality of types of data packets; and
  - receive a first data packet in the first QoS flow from a second core network device, wherein the apparatus is an access network device; and
- a transmitter, configured to:
  - send, to a distributed unit (DU), configuration information of a data radio bearer (DRB) corresponding to the first QoS flow, wherein the configuration information of the DRB comprises the QoS parameters respectively corresponding to the plurality of types of data packets; and
  - send the first data packet and second indication information to the DU, wherein the second indication information indicates a type of the first data packet, wherein:
- the transmitter is further configured to send third indication information to the DU, wherein the third indication information indicates quantities of downlink tunnel addresses respectively corresponding to the plurality of types of data packets; and
- the receiver is further configured to receive a first message from the DU, wherein the first message comprises the downlink tunnel addresses respectively corresponding to the plurality of types of data packets.

2. The apparatus according to claim 1, wherein the transmitter is configured to send a third data packet to the DU, wherein the third data packet comprises the first data packet and the second indication information, and the second indication information is carried in a header of the third data packet.

3. The apparatus according to claim 1, wherein:
- the transmitter is further configured to send the first data packet to the DU through a first tunnel, wherein a downlink tunnel address corresponding to the first tunnel is a downlink tunnel address corresponding to the type of the first data packet.

4. The apparatus according to claim 1, wherein the access network device is a base station.

5. An apparatus, comprising:

a receiver, configured to:

receive configuration information of a data radio bearer (DRB) from a central unit (CU), wherein the DRB corresponds to a first quality of service (QoS) flow, the first QoS flow supports a plurality of types of data packets, and the configuration information of the DRB comprises QoS parameters respectively corresponding to different types of the plurality of types of data packets;

receive a first data packet from the CU;

receive second indication information from the CU, wherein the CU is part of an access network device, and the second indication information indicates a type of the first data packet; and receive third indication information from the CU, wherein the third indication information indicates quantities of downlink tunnel addresses respectively corresponding to the plurality of types of data packets;

a transmitter, configured to send a first message to the CU, wherein the first message comprises the downlink tunnel addresses respectively corresponding to the plurality of types of data packets; and a processor, configured to perform downlink scheduling on the first data packet based on a QoS parameter corresponding to the type of the first data packet.

6. The apparatus according to claim 5, wherein the first data packet and the second indication information are carried in a third data packet from the CU, and the second indication information is carried in a header of the third data packet.

7. The apparatus according to claim 5, wherein the receiver is further configured to receive the first data packet from the CU through a first tunnel, wherein a downlink tunnel address corresponding to the first tunnel is a downlink tunnel address corresponding to the type of the first data packet.

8. The apparatus according to claim 5, wherein the access network device is a base station.

* * * * *